US012726807B2

(12) United States Patent
Blanc et al.

(10) Patent No.: US 12,726,807 B2
(45) Date of Patent: Sep. 1, 2026

(54) SYSTEMS AND METHODS FOR USERS TO AVOID ACTIVE DANGER AND GET TO A SAFETY ZONE

(71) Applicant: GRYCEPHIE, Capellen (LU)

(72) Inventors: Gilles Alain Georges Blanc, Centennial, CO (US); Rémy André Jean Blanc, King of Prussia, PA (US); Idomeneas Chorafakis, Toronto (CA)

(73) Assignee: GRYCEPHIE SARL, Capellen (LU)

(*) Notice: Subject to any disclaimer, the term of this patent is extended or adjusted under 35 U.S.C. 154(b) by 53 days.

(21) Appl. No.: 18/989,245

(22) Filed: Dec. 20, 2024

(65) Prior Publication Data

US 2025/0211962 A1 Jun. 26, 2025

Related U.S. Application Data

(60) Provisional application No. 63/613,811, filed on Dec. 22, 2023.

(51) Int. Cl.

| | |
|---|---|
| ***H04W 4/90*** | (2018.01) |
| ***G08B 21/02*** | (2006.01) |
| ***H04W 4/02*** | (2018.01) |
| ***H04W 4/029*** | (2018.01) |

(Continued)

(52) U.S. Cl.
CPC .............. *H04W 4/90* (2018.02); *G08B 21/02* (2013.01); *H04W 4/023* (2013.01); *H04W 4/029* (2018.02); *H04W 4/80* (2018.02); *H04W 64/003* (2013.01)

(58) Field of Classification Search
CPC ....... H04W 4/90; H04W 4/029; H04W 4/023; G08B 21/0272; G08B 29/02
See application file for complete search history.

(56) References Cited

U.S. PATENT DOCUMENTS

| | | | |
|---|---|---|---|
| 9,408,060 | B2 | 8/2016 | Helms et al. |
| 9,445,305 | B2 | 9/2016 | Lyon et al. |
| 9,485,603 | B2 | 11/2016 | Worrall et al. |

(Continued)

FOREIGN PATENT DOCUMENTS

| | | | |
|---|---|---|---|
| KR | 102005057 | B1 | 7/2019 |

OTHER PUBLICATIONS

International Search Report and Written Opinion received in Patent Cooperation Treaty Application No. PCT/US2024/061245, dated Apr. 30, 2025, 16 pages.

*Primary Examiner* — Mirza F Alam
(74) *Attorney, Agent, or Firm* — Johnston IP Law, PLLC

(57) ABSTRACT

In one instance, a system for locating users in an active emergency situation includes a plurality of user devices located within a coverage area; a computer capable of receiving data from and transmitting data to each of the plurality of user devices; a plurality of trackers located within the coverage area; a plurality of locator beacons located within the coverage area, wherein each of the locator beacons is associated with a location within the coverage area. At least one of the locator beacons wirelessly broadcasts a location signal indicating the location of the locator beacons. The location signal is received by at least one tracker. The tracker transmits the received location data to a mobile device, which in turn transmits the location data to the computer. The computer processes the location data to determine the location of the user, tracker, or mobile device within the coverage area.

20 Claims, 10 Drawing Sheets

(51) Int. Cl.
*H04W 4/80* (2018.01)
*H04W 64/00* (2009.01)

(56) References Cited

U.S. PATENT DOCUMENTS

| | | | |
|---|---|---|---|
| 10,104,642 | B2 | 10/2018 | Brennan et al. |
| 10,373,203 | B2 | 8/2019 | Shanmugam et al. |
| 10,517,048 | B2 | 12/2019 | Ramappa et al. |
| 10,721,147 | B2 | 7/2020 | Buscemi et al. |
| 10,903,917 | B1 * | 1/2021 | Pope ...................... H04B 17/27 |
| 12,372,645 | B2 * | 7/2025 | Booij ...................... G01S 15/66 |
| 2016/0112830 | A1 | 4/2016 | Soon |
| 2017/0339525 | A1 | 11/2017 | Schrader et al. |
| 2018/0048998 | A1 * | 2/2018 | Mahajan ............... H04W 4/025 |
| 2018/0053394 | A1 * | 2/2018 | Gersten .................. G08B 17/08 |
| 2020/0037115 | A1 * | 1/2020 | Ady .................... H04W 40/242 |
| 2021/0358280 | A1 | 11/2021 | Dorrell et al. |
| 2023/0262436 | A1 | 8/2023 | Linghammar et al. |

* cited by examiner

UUID-1
UUID-2
UUID-3
UUID-4
RANK 1
RANK 2
RANK 3
RANK 4+
MASTER

UUID
MAJOR (16-BITS)
MINOR (16-BITS)
RANK
WINDOW
SLOT
ID
CRC
WINDOW + SLOT
448
452
456
460
464
468

SYSTEMS AND METHODS FOR USERS TO AVOID ACTIVE DANGER AND GET TO A SAFETY ZONE

RELATED APPLICATION

This application claims the benefit of U.S. Provisional Patent Application No. 63/613,811, filed on Dec. 22, 2023, entitled, "Systems and Methods for Users to Avoid Active Danger and Get to a Safety Zone," the disclosure of which is hereby incorporated by reference for all purposes.

TECHNICAL FIELD

This application is directed, in general, to software-based safety systems, and more particularly to systems and methods for users to avoid active dangers and get to a safety zone.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Many places in the world have to deal with stressful active danger situations such as active gun shooters or tornados or other dangers. Various systems have been developed to attempt to assist in keeping people safe. Some of these systems are intended track people within a certain area in which an emergency situation is occurring. While such systems are known, improvements are desired.

DESCRIPTION OF THE DRAWINGS

Illustrative embodiments of the present disclosure are described in detail below with reference to the attached figures, which are incorporated by reference herein and wherein.

SUMMARY

Figure 1:
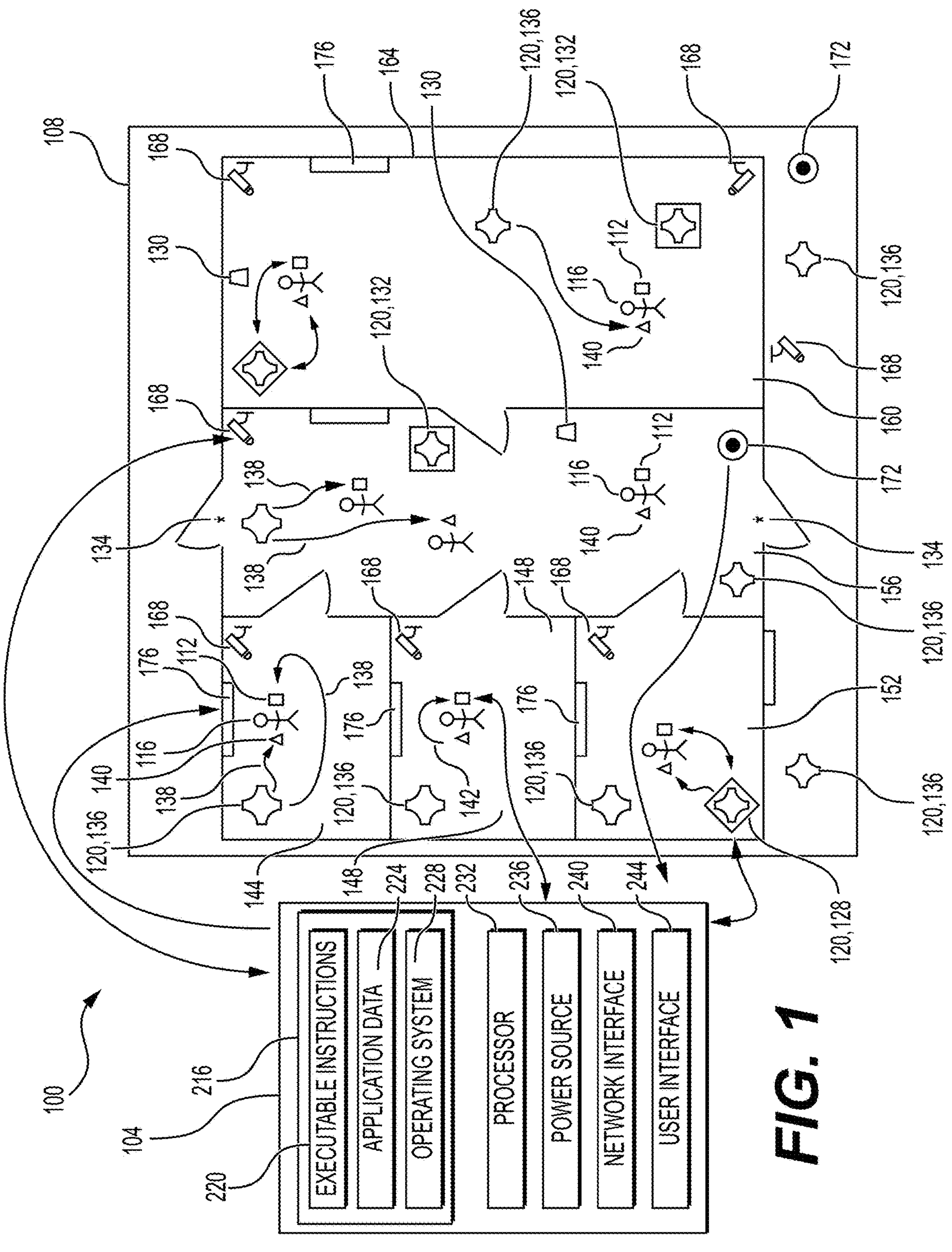
FIG. 1 is a schematic, representation of an illustrative embodiment of a system for locating and communicating with persons within a coverage area experiencing an active emergency.

In one illustrative embodiment, a system for locating users in an active emergency situation includes a plurality of user devices located within a coverage area, a plurality of trackers located within the coverage area, a plurality of locator beacons located within the coverage area; and a computer, having at least one computer processor executing computer program instructions stored on at least one non-transitory computer-readable medium, capable of receiving data from and transmitting data to each of the plurality of user devices. Each user device is capable of transmitting and receiving wireless signals. Each tracker is capable of transmitting and receiving wireless signals. Each of the locator beacons is associated with a location within the coverage area. At least one of the locator beacons wirelessly broadcasts a location signal. For each locator beacon that broadcasts the location signal, the location signal contains location data indicating the location within the coverage area that the locator beacon that broadcasted the location signal is associated with. The location signal containing the location data is received by at least one of the trackers. The location data contained within the location signal is wirelessly transmitted to at least one of the user devices by the at least one tracker that received the location signal. The location data that is received by the at least one user device is wirelessly transmitted to the computer by the at least one user device that received the location data. The at least one computer processor executes the computer instructions to process the location data to determine a location of a particular user device or a location of a particular tracker within the coverage area.

In one illustrative embodiment, a system for persons to avoid active danger includes a plurality of user devices located within a coverage area; a plurality of locator beacons located within the coverage area; a plurality of location trackers located within the coverage area; and a server in network communication with each of the plurality of user devices and having at least one computer processor executing computer program instructions stored on at least one non-transitory computer-readable medium. Each user device is associated with a particular person of a plurality of persons located within the coverage area. Each location tracker is associated with a particular person of the plurality of persons located within the coverage area. At least one of the locator beacons broadcasts a location signal. The location signal has location data indicating the location of the locator beacon which broadcasted the location signal within the coverage area. At least one location tracker receives the location signal. The server receives the location data contained in the location signal. The at least one computer processor of the server executes the computer program instructions to determine the location of at least one of the plurality of persons within the coverage area using the location data. The location data is transmitted to the server by the at least one location tracker that received the location signal or by at least one user device that received the location data after the at least one location tracker that received the location signal wirelessly transmitted the location data to the at least one user device.

In one illustrative embodiment, a method for locating users within a coverage area affected by an active emergency situation, the method includes the steps of: transmitting, using a first locator beacon located within a coverage area, a first wireless signal; receiving, using a location tracker located within the coverage area, the first wireless signal including the data indicating the location of the first locator beacon within the coverage area; transmitting, using the location tracker, a second wireless signal; receiving, using a mobile device located within the coverage area, the second wireless signal including data indicating the location of the first locator beacon within the coverage area; transmitting, using the mobile device, a third wireless signal; receiving, using a computer having least one computer processor capable of executing computer program instructions stored on at least one non-transitory computer-readable medium, the third wireless signal including the data indicating the location of the first locator beacon within the coverage area; and executing, using the least one computer processor, program instructions stored on the at least one non-transitory computer-readable medium to process the data indicating the location of the first locator beacon within the coverage area and to correlate the data indicating the location of the first locator beacon within the coverage area with the location of a person located within the coverage area. The first wireless signal includes data indicating a location of the first locator beacon within the coverage area. The second wireless signal includes data indicating the location of the first locator beacon within the coverage area. The third wireless signal includes the data indicating the location of the first locator beacon within the coverage area. The person located within the coverage area is associated with the location tracker.

DETAILED DESCRIPTION

In the following detailed description of the preferred embodiments, reference is made to the accompanying drawings that form a part hereof, and in which is shown, by way of illustration, specific embodiments in which the disclosure may be practiced. These embodiments are described in sufficient detail to enable those skilled in the art to practice the disclosure, and it is understood that other embodiments may be utilized, and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense, and the scope of the present disclosure is defined only by the claims. Unless otherwise indicated, as used throughout this document, “or” does not require mutual exclusivity.

According to an illustrative embodiment, systems and methods are provided to locate people within a coverage area that is currently experiencing an emergency situation and to provide a communication link to the people within the coverage area experiencing an emergency situation. One purpose of the system is to protect and preserve the lives of individuals who are at risk resulting from the emergency situation or a public safety incident such as an active shooter, or a natural disaster such as a tornado or earthquake. This is achieved by providing data-driven actionable information to at-risk individuals, while also providing emergency responders with critical information that enables them to attend to the needs of affected individuals more efficiently.

By collecting and analyzing information from each individual user, the illustrative system is able to provide each user with intelligent, actionable information that is relevant to their specific situation. For example, in an active shooter event, different people may be provided with different instructions depending on their location relative to the shooter and the availability of safe evacuation paths taking into account their current location, the location of active threats, and other information about the environment.

The system may provide near real-time situational awareness to first responders about the location of threats and at-risk individuals allowing first responders to more rapidly neutralize threats and attend to people in need of assistance.

The system may integrate many point security systems in a centralized command-and-control application that allows security staff and emergency responders to efficiently and effectively use all of the resources at their disposal. For example, during an active shooter incident, the system provides responders with near-real time information about the location of threats and at-risk individuals, directing people to safety while also allowing security staff to control the environment (e.g., lock/unlock certain doors) to achieve outcomes such as leading the threat away from people and toward a specific area.

Referring now to FIG. 1, aspects of the system 100 will be further discussed. The system 100 includes a computer or server 104 in network communication with several components or devices located within a coverage area 108. The system 100 is in network communication with a plurality of user devices 112. Each particular user device 112 is associated with a particular user 116 of a plurality of users 116. The user devices 112 may be any hand held or portable electronic computing device, such as a cellular phone operating the ANDROID or IOS operating systems capable of executing computer program instructions to run a mobile application 214 that facilitates network communication between the user devices 112 and the server 104 and displays information to the particular user 116 associated with the particular user device 112. As such, information and data is able to be passed via the network connection between the server 104 and the user devices 112.

The system 100 includes a plurality of locator beacons 120. The locator beacons 120 include three types of locator beacons 120, which are master beacons 128, smart beacons 132, and tracking beacons 136. The differences and functions of each of the master beacons 128, smart beacons 132, and tracking beacons 136 are discussed more fully below in relation to FIGS. 5-9. The locator beacons 120 are all capable of transmitting and receiving wireless signals 138 such as a BLUETOOTH signal. At least some of the locator beacons 120 transmit a signal that broadcasts the unique identity of the particular locator beacon 120 transmitting the signal. The locator beacons 120 are stationary within the coverage area and have a known location to the system 100.

Therefore, when the system 100 receives information that a component has received a signal from a locator beacon 120, which includes data identifying the locator beacon 120, the system 100 is able to determine that the component that received the signal is within a certain distance from that particular locator beacon 120.

The system 100 includes a plurality of locator tags 140. The locator tags 140 are wearable devices that may be worn by a user 116 located within the coverage area 108. The locator tags 140 include radios that are able to receive wireless signals 138 that are transmitted from the locator beacons 120. The locator tags 140 are further capable of transmitting wireless signals 142, such as BLUETOOTH signals, to user devices 112 or other devices.

Figure 2:
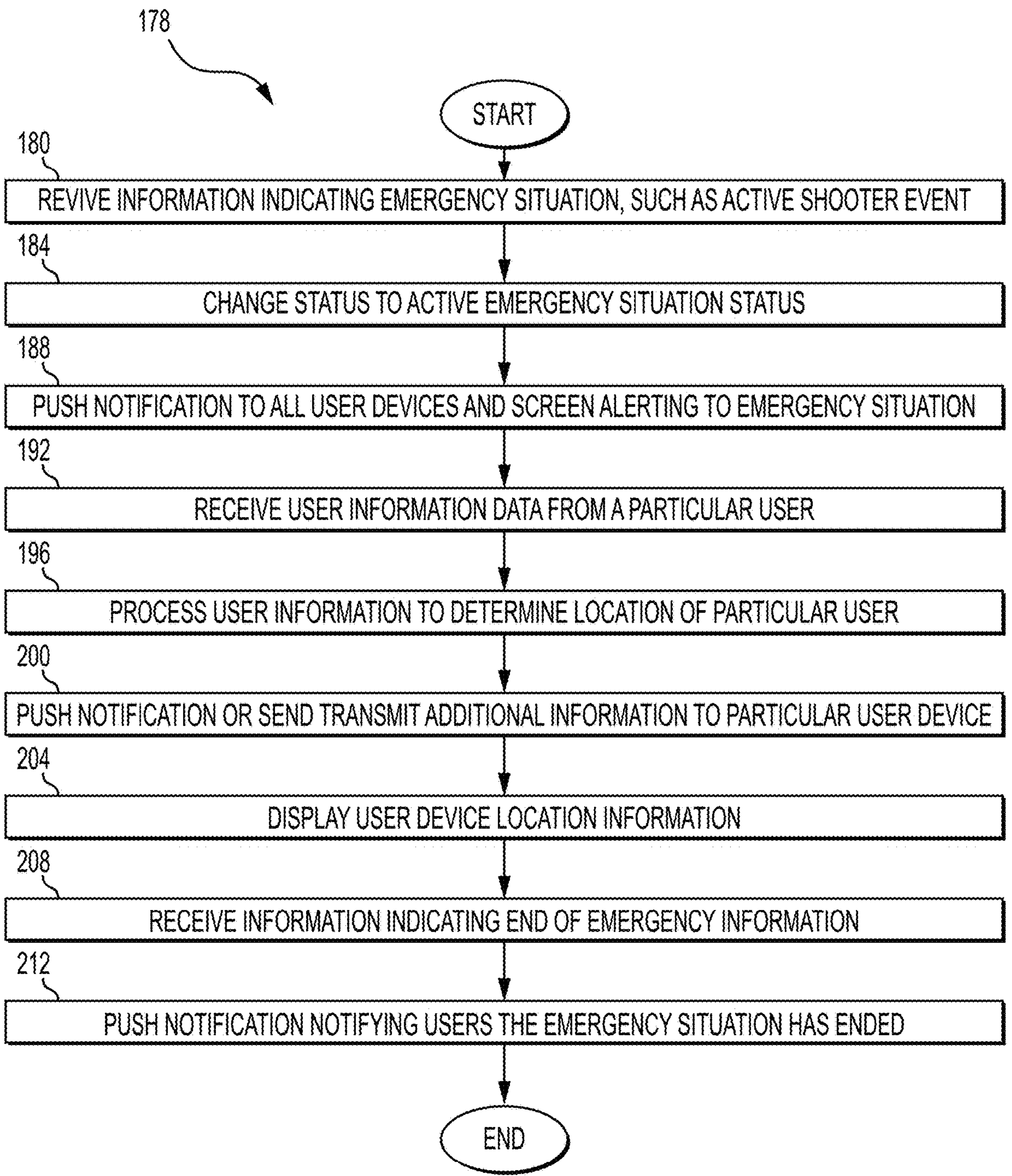
FIG. 2 is a schematic, illustrative method for locating and communicating with persons within a coverage area experiencing an active emergency.

Still referring primarily to FIG. 1 and also to FIG. 2, the general locator functions of the system 100 will be further described. The system 100 utilizes both the user devices 112 and the locator tags 140 in conjunction with the locator beacons 120 to determine the position of a user 112 within the coverage area 108.

For illustration purposes, the coverage area 108 of FIG. 1 can be a school having a classroom A 144, a classroom B 148, a classroom C 152, a hallway 156, and a cafeteria 160. The users 116, which in the example of a school may be students or teachers, are dispersed throughout the building 164 and may even be located outside of the building 164. The coverage area 108 includes the area in which the building 164 is located and additional area surrounding the building 164. Locator beacons 120 are placed within the coverage area 108 at known locations. For example, locator beacon 120 located in classroom A 144 is known by the system to be located within classroom A because the precise location of this particular locator beacon 120 was noted upon installation of the locator beacon 120 and uploaded into the server 104 at the time of installation. As discussed in more detail below, each locator beacon 120 may transmits a wireless signal containing information that identifies the locator beacon 120 from which the signal was transmitted, and tracker beacons 136 transmit such a signal at all times the tracker beacons 136 are in transmit mode. Both the user device 112 and the locator tag 140 associated with the user 116 present in classroom A 144 are able to receive the incoming wireless signal 138 from the locator beacon 120 located in classroom A 144 because each of the user device 112 and the locator tag 140 are within range of the locator beacon 120 located in classroom A 144.

When the user device 112 receives the wireless signal 138, program instructions operating on the user device 112 are able to interpret the information transmitted from the locator beacon 120. In this manner, the user device 112 is able to determine its location. In other words, the user device 112 is able to determine that the user device 112 is located within classroom A 144 because it is in range of the particular locator beacon 120 located in classroom A 144.

The user device 112, which may be a cellular phone, may also be equipped with Global Positioning System ("GPS") functionality. The program instructions located on the user device 112 may also be able to utilize the GPS functionality of the user device 112 to determine the location of the user device 112. However, in many buildings 164, the built in GPS functionality of the user device 112 is insufficient to determine the location of the user device 112 with sufficient precession to make a determination as to which room within the building 164 the user device 112 is located. For example, the building 164 may be a large multi-story building made primarily from concrete. GPS functionality is dependent on the user device 112 being able to reliably receive GPS satellite signals. In these situations, the case of a large concrete multi-story building, the ability to receive GPS signals is decreased because the GPS satellite signals are blocked by the structure of the building 164. In these circumstances, the user device 112 cannot determine its location using GPS functionality because no GPS satellite signal is received or the user device 112 cannot determine its location with sufficient precision because only weak or and insufficient number of GPS satellite signals are received.

Whether the user device 112 determines its location utilizing GPS functionality or using the functionality of the locator beacons 120 and locator tags 140, the user device 112 is able to transmit that location information to the server 104. The user device 112 may either transmit the location as determined by the user device 112 or the data needed for the server 104 to determine the location of the user device 112, or the user device 112 may transmit both. In addition, the user device 112 may also transmit information regarding the reliability of the information used to determine the location of the user device 112. For example, the user device 112 may report that due to weak GPS signal reception, that the GPS location reported by the user device 112 is unreliable or not precise enough and the location determined by the locator beacon 120 and locator tag 140 process is more reliable, or vice versa.

In this manner, the server 104 is informed of the location of the user devices 112 and, inherently, of the locator tags 140 within the coverage area 108. Since the user devices 112 are likely to be in the possession of the users 116 and the locator tags 140 are intended to be wearable by the users 116, the location of a user device 112 or of a locator tag 140 indicate the location of the different users 116 within the coverage area 108.

In some circumstances, users 116 may not possess both user devices 112 and locator tags 140. Users 116 may only possess user devices 112 or may only possess locator tags 140. In the case that users 116 only possesses user devices 112 and do not possess locator tags 140, the combination of the locator beacon 120 and the user device 116 may be used to determine the location of the user device 112 within the coverage area 108. The user device 116 may directly receive the wireless signal 138 transmitted from the locator beacon 120. The user device 112 is thereby located utilizing the identification information of the locator beacons 120 transmitted in the wireless signal 138, as described above in relation to receipt of the wireless signal 138 by the locator tags 140.

In the case that users 116 possess only locator tags 140 and do not possess user devices 112, the user 116 can still be located utilizing the locator tag 140. An example of users 112 within the coverage area 108 that possess only locator tags 140 and do not possess user devices 112 may be visitors to the site who are provided with the locator tags 140 upon arrival but have not installed the appropriate programming applications on the visitors' cellular phones to allow the cellular phones to communicate with the server 104. In this scenario, the locator tag 140, which is worn by the user 116, is able to receive the wireless signal 138 from the locator beacons 120 for which it is in range. This provides location information to the locator tag 140. Since the person's cellular phone, if the person has one in the person's possession, does not have the mobile application 214 to allow the cellular phone to communicate with the locator tag 140, the information cannot be passed to that cellular phone. However, the information can be passed to any user device 112 within transmission range of the locator tag 140 utilizing wireless signal 142. The wireless signal 142 contains identification information within the signal 142 that identifies the source of the signal, i.e. the identity of the locator beacon 120 that transmits the wireless signal 138 is included in the wireless signal 142. Therefore, the user device 112 that ultimately receives the wireless signal 142 is able to pass along both the identification information of the locator tag 140 and the location information of the locator tag 140 to the server 104. Thereby, software operating on the computer 104 is able to determine the location of the user 116 that only possesses a locator tag 140 and does not possess a user device 112. In addition, the wireless signal 142 transmitted by the locator tag 140 can be received by master beacons 128, which can then pass the information to the server 104, since the master beacons 128 have a network connection.

Referring still to FIG. 1, additional components that may be included in the system 100 or components that may be in communication with the system 100 will described. The system 100 may include or may be in communication with a plurality of security cameras 168. The network communication between the security cameras 168 and the server 104 may be a direct connection in which the communication link is integrated into the system 100 or the connection may be by and through third party connections. The security cameras 168 may be used to remotely determine the location of users 116 or other people within the coverage area. The security cameras 168 are dispersed throughout the coverage area 108. A backend user 246 of the system 100 may be able to view video feed from the security cameras 168 to determine the number and location of people within the coverage area 108; identify or locate specific threats within the coverage area 108; or automatically identify the presence of an active emergency situation within the coverage area. For example, video feed transmitted to the server 104 may be analyzed for indicators of a threat, such as running or screaming people. Upon the identification of some activity in the video feed that indicates the possibility of an active emergency situation, the system 100 may automatically trigger an active emergency protocol as further described herein.

The system 100 may also include or be in communication with gunshot detectors 172. Gunshot detectors 172 are devices that are designed to monitor sounds within the coverage area 108 and to automatically recognize the sound of a gunshot. The gunshot detectors 172 are in network communication with the system 100. The network communication between the gunshot detectors 172 and the server 104 may be a direct connection in which the communication link is integrated into the system 100 or the connection may be by and through third party connections. Upon detecting the possibility of a gunshot occurring within or near the coverage area 108 the gunshot detectors 172 may communicate this information to the server 104. Responsive to receiving such information, the system 100 may automatically trigger an active emergency protocol as further described herein.

The system 100 may also include or be in network communication with display screens 176. The network communication between the display screens 176 and the server 104 may be a direct connection in which the communication link is integrated into the system 100 or the connection may be by and through third party connections. The display screens 176 may receive and display information regarding the status of the system 100 or the status of an ongoing, possible, or recent active emergency situation.

The system 100 may also include or be in network communication with public address systems 130 or remote access systems 134. The public address systems 130 are components capable of making or broadcasting messages, such a PA system disbursed throughout a school or other facility. The system 100 may transmit signals to the public address systems 130 providing messages to users 116 regarding the active emergency situation. The remote access systems 134 may include devices for remotely controlling doors, windows, lock, and the like within the coverage area 108. The system 100 may communicate with the remote access systems 134 to activate components of the remote access systems 134 during an active emergency situation. For example, the system 100 may transmit a signal to the remote access systems 134 to lock or unlock certain doors within the coverage area 108.

Referring now primarily to FIG. 2, a method for locating users 116 within a coverage area during an active emergency situation will be further described. At step 180, the system 100 receives information indicating an ongoing, possible, or recent active emergency situation. The system 100 may receive this information from a number of sources, for example, a backend user 246 may manually input the information into the system 100 after receiving such information, for example a 911 call may be reported to the backend user 246 indicating a possible active shooter event, or the system 100 may receive information from sensors or other input devices included within the system 100 or in communication with the system 100 indicating an ongoing or possible active emergency situation, for example, the gunshot detectors 172 or security cameras 168 may provide information to the system 100 indicating a possible active shooter event.

Responsive to receiving information indicating an ongoing, possible, or recent active emergency situation the method proceeds to step 184. At step 184, the system 100 changes the status of the system 100 to an active emergency situation or incident status.

The method then proceeds to step 188, where the system 100 sends a push notification to all user devices 112 that provides a notification to the users 116 of the current active emergency status. In response to receipt of the push notification, the user devices 112 transmit user device location information to the server 104. The user device location information may be obtained by the user device 112 by and through the GPS services of the user device 112 or the locator beacon 120, locator tags 140, user device 112 interactions described above in relation to FIG. 1. When utilizing the beacon swarm technique, the server 104 may also, at this step, transmit a wireless signal to master beacons 128 that include instructions to change the status of locator beacons 120 to an incident status, as more fully described below.

At step 192, the user device location information for the various user devices 112 present within the coverage area 108 is received by the server 104. At step 196, the system 100 processes the user device location information for each user device 112 to locate the user devices 112 within the coverage area. Alternatively, the user devices 112 may process the user device location information and transmit the user device 112 location directly to the server 104.

The steps of receiving user device location information 192 and processing the user device information to determine the location of user devices 196 may be repeated multiple times during the ongoing course of an active emergency situation while the system proceeds with the other steps of the method. In other words, the system 100 continues to periodically update the location of user devices 112 within the coverage area 108 throughout the entirety of the active emergency situation. Doing so allows for the system 100 to keep track of and locate user devices 112 as the user devices are relocated within the coverage area 108.

At step 200, the system 100 may send push notifications or transmit additional information to all user devices 112 or to particular user devices 112. For example, the system 100 may send particular user devices 112 a suggested action for the user 116 associated with the user device 112 to take in response to the active emergency situation based on the location of the user device 112. For example, in an active shooter situation, the system 100 may, using the location of the user device 112, the location of an active shooter, or a map of the coverage area 108, generate a proposed route of escape and transmit this information to the user device 112. As another example, the system 100 may, using the location of the user device 112, the location of an active shooter, or a map of the coverage area 108, determine that no reasonably safe route of escape exists and send a push notification to the user device 112 advising the user 116 to hide in place. As the user device 112 location, active shooter location, or other emergency information changes, the system 100 may repeat step 200, as needed, to provide further information or other advice to the user 116. Push notifications and further additional information may be generated automatically by the system 100 or may be inputted by a backend user 246 of the system 100 based upon available knowledge to the system 100 or the backend user 246. At step 200, the system 100 may also transmit to display screens 176 message or other information to be displayed on the display screens 176. Such information may include information regarding the status of the active emergency situation, the location of dangers, possible routes of escape, and the like, to name a few.

At step 204, the system 100 may display to backend users 246 the user device locations determined at step 196. Such display may include a map of the coverage area 108 indicating the known positions of user devices 112 within the coverage area 108. Such information may be conveyed to emergency personal to assists emergency personal in addressing the active emergency situation. Step 204 may be repeated periodically to update the user device locations on the display.

The above steps may repeat as necessary during the course of an active emergency situation as needed to provide up to date and current information to the system 100, to backend users 246, to the users 116, other users, or emergency personal.

At step 208, the system receives information that the active emergency situation has ended. Such information may be inputted by backend users 246 of the system 100. In response to receiving information that the active emergency situation has ended, the system 100 may proceed to step 212 where the system 100 transmits push notifications to the user devices 112 notifying the users 116 that the emergency situation has ended.

Not all of the steps of the method 178 need be performed by the system 100. In addition, the steps of method 178 are not necessarily performed in the order presented.

Referring again primarily to FIG. 1, the server 104 of the system 100 will be discussed. The server 104 is a computer having least one computer processor 232 executing computer program instructions 220 stored on at least one non-transitory computer-readable memory 216. Application data 224 and an operating system 228 are also stored on the memory 216. The server 104 further includes a power source 236 for providing electrical power to the server 104 and its components; a network interface 240, for providing wired or wireless network connectivity to the server 104; and a backend operator user interface 244, for allowing interaction between the server 104 and backend users 246. For example, the backend operator user interface 244 may include a display screen, a keyboard, a mouse, and other like input and output devices that allow for backend users 246 to interact with the server 104. The user interface 244 may allow backend users 246 to remotely access the server via the network interface 240.

Figure 3:
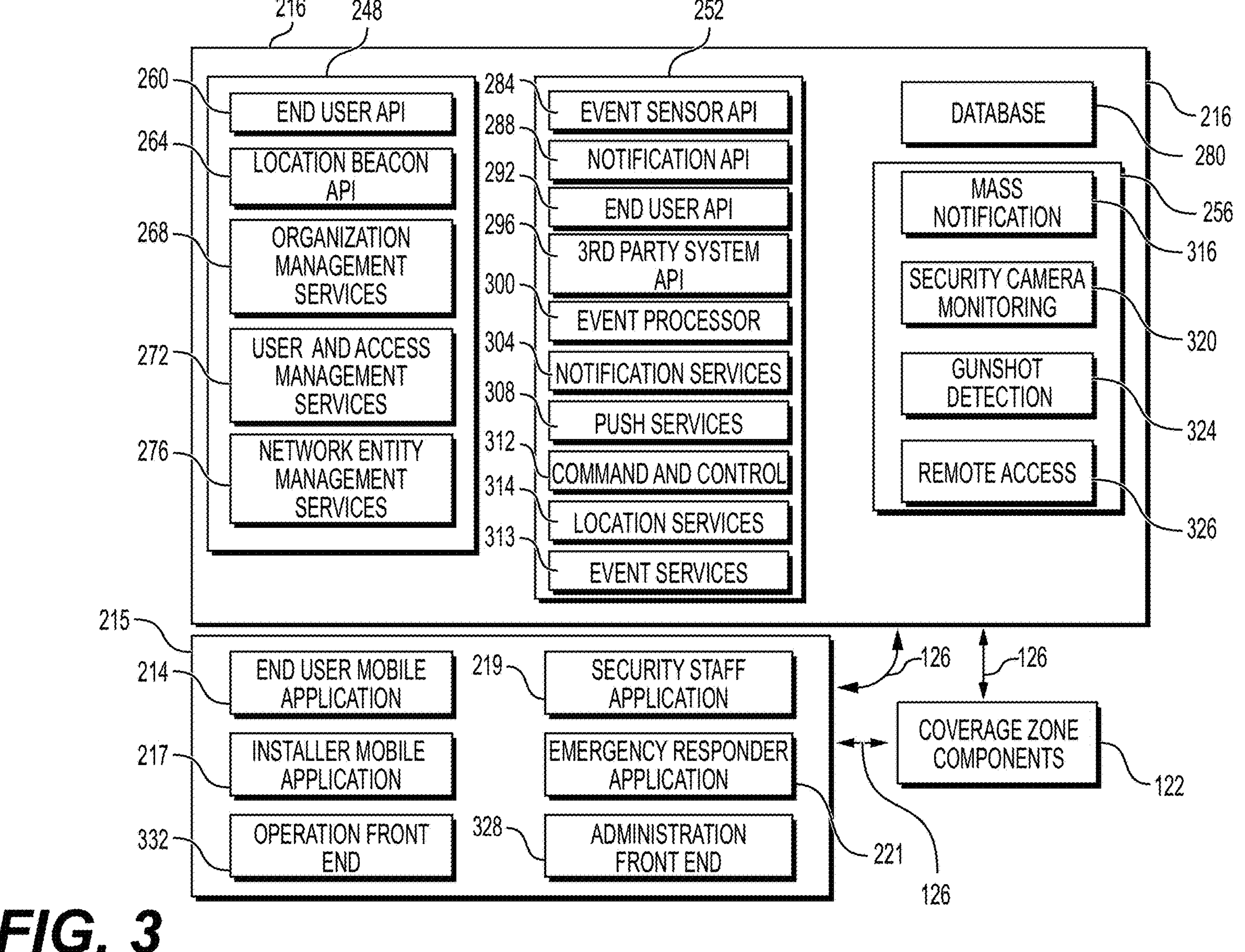
FIG. 3 is a schematic, representation of modules, services, and APIs of an illustrative embodiment of a system for locating and communicating with persons within a coverage area experiencing an active emergency.
Figure 4:
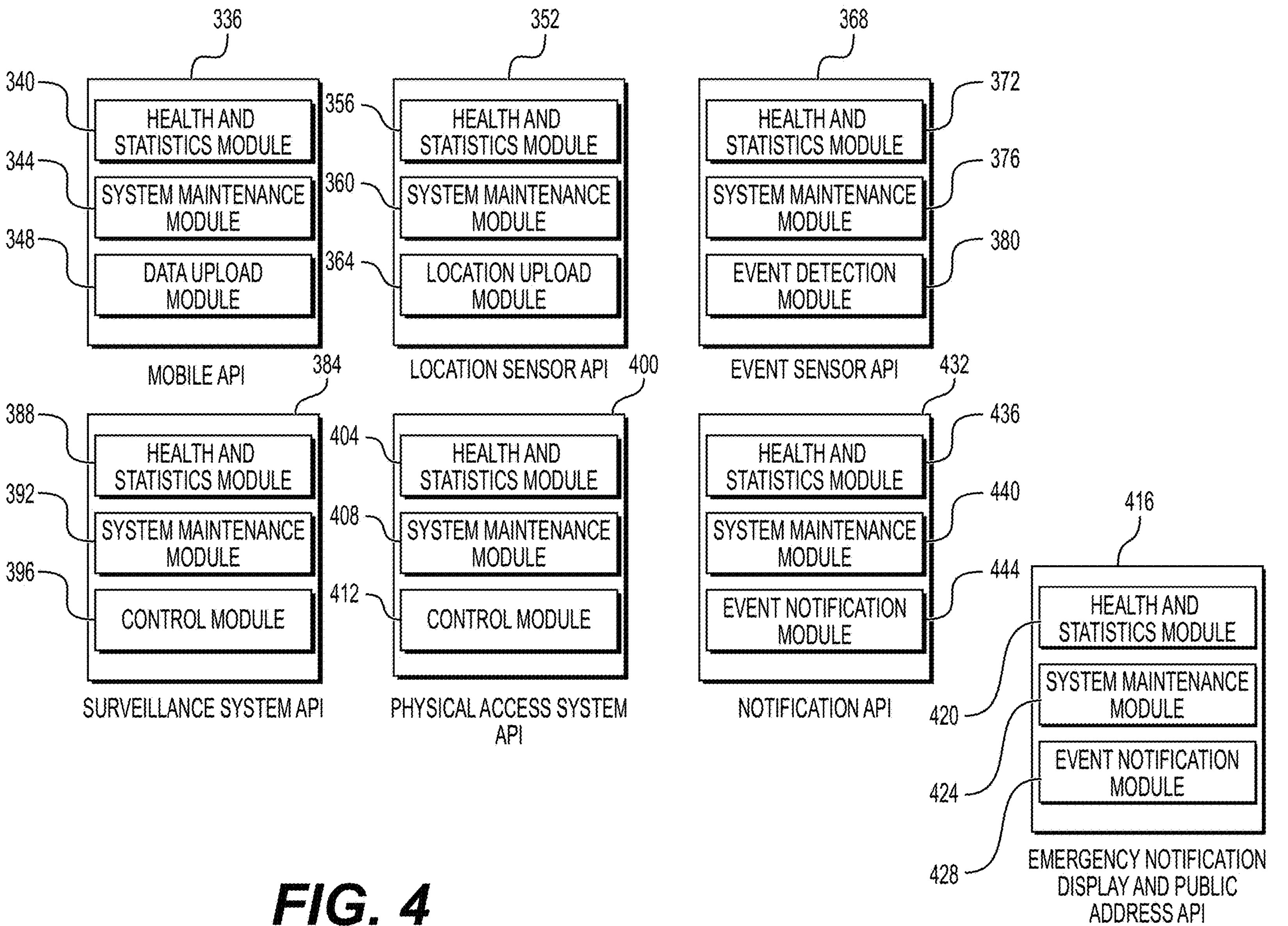
FIG. 4 is a schematic, representation of modules, services, and APIs of an illustrative embodiment of a system for locating and communicating with persons within a coverage area experiencing an active emergency.

Now referring to FIGS. 3 and 4, and primarily to FIG. 3 the data structures and integrated application modules of the system 100 will be further described.

The system 100 may implement a simple modular and layered architecture. The modular design and layered architecture of the system 100 allows simple addition and deletion of new services, new tracking devices and technologies, and new interfaces to applications and components managed by the system 100.

As discussed in relation to FIG. 1, executable instructions 220 and application data 224 is stored on the memory 216 of the server 104. The executable instructions 220 and application data 224 of the memory 216 may be divided into system core functions 248, system edge functions 252, and third party systems 256. A database 280 is also stored in memory 216.

With respect to the core functions, administration, and database, the system core functions 248 may be responsible for the following: access control and management of the system 100 system users 116; management of organizations and floor maps; management of the system 100 backend users 246 (de/registration, modification, authentication); management of locator tags 140 (de/registration, modification, authentication); management of locator beacons 120 (de/registration, modification, authentication, configuration); management of event sensors such as gunshot detectors 172 nodes and systems (de/registration, modification, authentication); management of display screens 176 (de/registration, modification, authentication); management of security cameras 168 (de/registration, modification, authentication); management of remote access systems 134 (de/registration, modification, authentication); management of public address systems 130 (de/registration, modification, authentication); management of third party directory databases (de/registration, modification, authentication); service and health monitoring (logs, alerts, notifications); data security to ensure confidentiality, integrity and availability protecting access to data; and platform operation, administration and maintenance; to name a few.

The system core functions 248 may be organized into various APIs or modules. The system core functions 248 may include an end user API 260; a location beacon API 264; an organization management services module 268; a user and access management services module 272; and a network entity management services module 276.

The location beacon API 264 is an application programming interface that is used to communicate with locator beacons 120 that are deployed in the coverage area 108. The location beacon API 264 allows locator beacons 120 to send periodic reports about the location of all locator tags 140 within the vicinity of the beacon. The information received via location beacon API 264 is stored in the database 180 for further processing by other application components.

The organization management services module 268 may be responsible for managing information regarding the organization utilizing the system 100.

The user and access management services module 272 may be responsible for managing user 116 and backend user 246 registration and access to the system 100.

The network entity management services module 276 may be responsible for managing appropriate network communication links within the system 100 and for transmitting and receiving data and information over network communications.

With respect to the edge functions, services, and database, system edge functions 252 of the system 100 may be responsible for the following: command and control module, which includes different sub-modules that run the various business logic algorithms responsible for event analysis understanding the particulars of an emergency situation in progress, determining the best course of action for the at-risk users 116 based on their location and providing the appropriate instructions; management of organization configuration; access control and organization user management; management of backend user 246 (de/registration, modification, authentication); management of locator tags 140 (de/registration, modification, authentication); view of locator beacons 120 nodes; view of gunshot detectors 172 nodes and systems; management of display screens 176 (de/registration, modification, authentication, notification delivery); management of security cameras 168 and systems (de/registration, modification, authentication, control . . . ); management of remote access system 134 (de/registration, modification, authentication, control); management of public address systems 130 (de/registration, modification, authentication); third party system event reception module and processing (there may be one module per third party system type); business logic for event and incident processing; emergency and incident response management; edge function service and health monitoring (logs, alerts, notifications); and data security to ensure confidentiality, integrity and availability, protecting access to data; to name a few.

The system edge functions 252 maybe be organized into various APIs or modules. The system edge functions 252 may include an event sensor API 284, a notification API 288, an end user API 292, a third party system API 296, an event processor module 300, a notification services module 304, a push services module 308, a command and control module 312, a location service module 314, and an event service module 313, to name a few.

The event sensor API 284 is an application programming interface that is used to communicate with sensor system that may detect the presence of an active emergency situation such as a gunshot detection system including a gunshot detection module 324 and gunshot detectors 172.

The notification API 288 is an application programming interface that is used to coordinate communication between the display screens 176 deployed in the coverage area 108 and core or edge backend application components. Operations supported by this API may include: periodic health and statistics uploaded from display screens 176; a system maintenance API endpoint that is periodically polled by the display screens 176 to see if there are any administrative actions the display screens 176 need to execute (e.g. reboot, upgrade, diagnostics); and a display instructions API endpoint that tells the display screens 176 what to display based on their identity.

The push services module 308 provides the functionality that is needed to send push notifications to the different types of user devices 112 (e.g., Android, iOS, Windows, etc.) that are running the mobile application 214. With respect to the push services module 308, the system 100 may provide modules to integrate with the third party backend systems. Depending on the choice for the system 100 deployment, in a cloud a cloud service such as Amazon Simple Notification Service, Azure Notification HuBs Service, Firebase Cloud Messaging or others can be used.

The push services module 308 provides an interface that can trigger push notifications to be sent to user devices 112. The service caller provides the following information about notification targets which identifies the user devices 112 that should receive push notifications. The notification targets can be made by a device identifier that identifies a single user device 112, a group identifier that identifies a group of user devices 112, or a topic identifier that identifies mobile application 214 instances that should receive notifications of a particular topic. In addition to the notification target, the caller also provides the notification data which describes the contents of the notification to be sent.

The push services module 308 performs necessary data validation and passes the request to a push service router. The push service router is responsible for using one or more internal or third party services to ensure that the push notification is delivered to all applicable destinations.

The push services module 308 may support external third party services such as firebase cloud messaging and APNS as well as an internal push notification server to deliver push notifications to their final destination. The push services module 308 may include a push service client instance to implement client functionality that is required to trigger external third party push notification services to deliver the notification to the appropriate endpoints.

The push services module 308 may include a push service server that is an internal push notification provider that uses persistent TCP connections with mobile application 214 instances that use the internal push notification mechanism.

The system edge functions 252 may include the command and control module 312. The command and control module 312 is the "brains" of the core or edge backend application. The command and control module 312 may include different sub-modules that run the various algorithms and AI models that are responsible for performing analysis to understand the particulars of an emergency situation in progress, determine the best course of action for users 116 based on their location and provide the appropriate instructions by means of a user device 112 or display screens 176, and keep other stakeholders such as first responders, law enforcement, guardians and administrative personnel informed by providing them with real-time actionable information and updates through the rest of the application components.

The system edge functions 252 may include the notification services module 304. The notification services module 304 is responsible for initiating notifications that need to be sent out as part of the emergency response. An active shooting notification may include a message to be displayed on the display screens 176 directing people to the nearest safe exit, along with a separate notification to the mobile application 214 informing users 116 that there is an active shooter situation and to follow the instructions on the display screens 176 nearest them, or to open the system 100 mobile application 214 for further instructions.

The system edge functions 252 may include the location service module 314. The location service module 314 may be a core or edge backend application component that processes location information in the database 280 that was previously uploaded through the location Sensor API or a mobile API. The location service module 314 uses all of the available information to maintain a current view of the coverage area 108 and of all individuals within the coverage area 108.

The system edge functions 252 may include the event service module 313. The event service module 313 may be a core or edge backend application component that processes event information in the database that was previously uploaded through the event sensor API 284 or submitted by a user 116 through the mobile application 214. The purpose of the event service module 313 is to capture event information and to perform the required backend calculations and normalization before storing the data in the database 280 for further processing by the command and control module 312.

The system 100 may include a mobile API. The mobile API 144 is an application programming interface that provides the core or edge backend application interface that the mobile application 214 uses to send information to the server 104 or system 100 core. This includes application status information, statistics, as well as application-level data such as proximity information, sensor readings, audio and video information.

The system 100 may also include a number of APIs or modules that are stored in memory 215 of a remote device such as a user device 116. These may include the mobile application 214, an installer mobile application 217, an operator front end application 332, a security staff application 219, an emergency responder application 221, and an administration front end application 328. Each of such applications are performed by computer instructions stored in the memory 215 of a mobile device or other computing device, such as a general computer and provide functionality of and access to the system 100 for various purposes as described herein.

The system 100 may include the administration front end module 328. The administration front end module 328 is a web based graphical user interface that provides system administrators or backend users 246 with access to all of the functions needed to support and maintain the system 100. This includes items such as user management, device management, diagnostics, system upgrades, etc.

The system 100 may include the operator front end module 332. The operator front end module 332 is a web based graphical user interface that provides backend users 246 with a view of all of the information needed to operate the system 100 including managing incidents, generating notifications, overriding system behavior, etc.

The system may include the mobile-friendly security staff application 219 that security staff use during an incident to obtain critical information, control solution components and coordinate response efforts with law enforcement and private security staff. The security staff application 219 is a mobile-friendly web application that can be provided to emergency responder command-and-control personnel to have visibility into critical information that can be used to direct the on-site responders.

The mobile application 214 is installed on mobile devices such as iOS and Android devices (e.g. user devices 112) by all individuals who are part of the organization using the system 100. For example, in the context of a university, the mobile application 214 is installed by all students, faculty and administrative staff. This allows (a) The system 100 to track the location of each individual, (b) individuals may use the mobile application 214 to send information to the system 100 system and (c) users 116 obtain timely and helpful information about an incident in progress.

The installer mobile application 217 is a mobile-friendly application that may be implemented as a web application, or a native application. The installer mobile application 217 provides the capabilities needed by an installer deploying the various field devices to configure the devices and to register the devices with the system 100.

The memory 216 of the system 100 may also contain a number of third party 256 API's or modules intended to integrate the system 100 with third party applications or systems. For example, the system 100 may include a mass notification module 316, a security camera monitoring module 320, or a gunshot detection module 324, to name a few.

The security camera monitoring module 320 allows security staff to monitor the security cameras 168 feeds. The level of integration between the system 100 and security cameras 168 provided by a third party depends on the capabilities of the specific system deployed within the coverage area 108.

The gunshot detection module 324 provides integration of third party gunshot detectors 172 with the system 100, that detect and locate gunshots within the coverage area 108. The level of integration depends on the capabilities of the specific system deployed at the facility.

The mass notification module 316 enables mass notifications to be delivered to users 116 through third party notification systems. The level of integration depends on the capabilities of the specific system.

The remote access module 326 enables the system 100 to integrate with and control the access devices 134 such as doors and locks remotely during an emergency when the access devices 134 are provided by a third party system. The level of integration depends on the capabilities of the specific system.

It should be understood that other third party 256 API's or modules may be used as needed depending on the devices and functionalities present within a coverage area that are desired to be integrated with or in communication with the system 100.

Network connections 126 provide communication pathways between the modules and applications of the server 104, user device 112, and coverage zone components 122 (coverage zone components 122 being the components, as described herein, located within the coverage area 108 that have network capability.

It should be understood that the above described API's and modules and their characterization as being system core functions 248, system edge functions 252, and third party systems 256 are illustrative in nature. Specific implementations could vary in the number and type of API's and modules of the system 100. In addition, the functions of some system core functions 248, system edge functions 252, and third party systems 256 API's or modules could overlap. In addition, in some implementations, an API or module characterized as a system core functions 248, system edge functions 252, or third party systems 256 may be characterized as a different type of API or module in a different implementation. For example, the gunshot detection module 324 may be a third party system 256 module when the gunshot detectors 172 are provided by a third party, but when the gunshot detectors are provided as an integrated part of the system 100, the gunshot detector module 324 may be a core functions 248 or system edge functions 252.

Still referring primarily to FIG. 3, the database 280 of the system 100 provides the system 100 with a high-performance, fault-tolerant, and scalable distributed database system. The database 280 is specifically designed to support mission-critical applications and provide access to solution data across multiple nodes in the cluster. The database 280 employs advanced replication and synchronization techniques to ensure data consistency, minimize latency, and maximize throughput across all nodes.

The database 280 may be composed of multiple databases, each responsible for storing, processing, and managing the data set for each organization, thereby distributing the workload and increasing overall system performance.

A cluster management component of the system 100 is responsible for monitoring the health and performance of the entire system 100, as well as coordinating communication and data synchronization between nodes. This component also handles the addition or removal of nodes from the cluster, automatically rebalancing data as needed to maintain optimal performance and availability.

A load balancing and query routing component of the system 100 is responsible for distributing the workload and optimizing system performance. Incoming queries are analyzed and routed to the most appropriate database 280. This ensures that the system 100 can efficiently handle both read-heavy and write-heavy workloads, while also adapting to changes in demand or system conditions.

The system 100 logical reference configuration may split the system 100 functions as follows: (1) The system 100 administration function: The system 100 administration function hosting the core functionality, administration and database components. The system 100 administration function may be hosted on a cloud. The system 100 administration function hosts the administrative capabilities of the solution. The system 100 administration function is shared amongst multiple organizations; (2) The system 100 edge function: The system 100 edge function hosts the required configuration and data (including location data) for interactions between the system 100 solution with the relevant nodes, end-user mobile application 214, display screens 176, security cameras 168, public address systems 130, or remote access systems 134. The system system 100 edge function may be hosted on premises or on the cloud.

The system 100 administration function may include: (1) One instance in case of deployment without redundancy; and (2) Two instances in active/standby mode in case of deployment with redundancy.

The system 100 administration function implements the database 280. In case of deployment with redundancy, the database 280 of the active instance of the system 100 administration function is replicated to a standby instance of the system 100 administration function. System 100 administration function instances can be deployed on a physical server or on a virtual machine (public cloud).

The system 100 edge function may include N independent instances. The number N depends on traffic dimensioning, redundancy requirements, and technology isolation requirements. There may be a dedicated system 100 edge function per organization or per deployment of the system 100.

The system 100 edge function instance can be deployed on a physical server, on a virtual machine, or as a public or private cloud instance.

With respect to data synchronization of the system 100 administration function and system 100 edge function There is a near-real-time data synchronization between the system core functions 248 and the system edge functions 252 whereby any changes to the common datasets such as (but not limited to) the network entity ("NE") list, NE configuration, NE status, Organization, Site, Floor configuration and other objects' data is synchronized in a bi-directional manner.

The system core functions 248 may be designed to serve multiple end customers (referred to as "Organizations"). The system 100 is implemented with the concept of "Organization" where an organization represents the physical entity where coverage area 108 is located. Access to the system 100 functionality is handled through organizational hierarchy and user roles.

With respect to the organizational hierarchy, by default the first hierarchy layer deals with the system core management and its corresponding configuration. This is a predefined layer with specific access given to the entity in charge of the system 100 management.

The next layer represents the "Organization". It represents the entity that is using the system 100. When the system 100 solution is deployed specifically for a single entity there will only be one organization defined in the system. This is referred to as a "single-Tennant" solution. However, when the system 100 system is deployed for multiple (and separate) entities then there will be multiple Organizations in the system. This is referred to as a "multi-Tennant" solution.

The system 100 administration function may be common to all deployment. The system 100 edge function instance may be instantiated per tenant.

It is desirable in the system 100 to achieve a high degree of availability in order to ensure that the system 100 is available and able to provide the expected functionality in a moment of crisis. As a distributed system, redundancy and availability may be achieved across the entire distribution from the extreme edge all the way to the core. This may include IoT devices deployed on premises, edge function components, core function components, technology connectors, databases etc. Redundant hardware and software components, communication interfaces, devices and nodes may be deployed, with the appropriate functionality at every level to ensure that alternate detection, computation and communication methods exist to anticipate and mitigate outages.

The following are some examples of approaches to achieving a high degree of availability for the system 100 components: (1) Location Sensors: devices that are deployed on premises shall be deployed in sufficient density that outage of a single node shall not create dead-zones where it is not possible to detect a user carrying a device being tracked such as a smartphone or badge. (2) Edge & Core function components: these are software components that can be deployed on physical hardware or virtualized/cloud instances. The computer platforms (servers or cloud instances) themselves will be deployed in an active-active redundant configuration such that the failure of a single node will result in processing being taken over by the redundant node. Communication interfaces may also be deployed in redundant pairs such that failure of a single NIC will result in fail over to an alternate communication path. (3) Database: the core application database may be deployed in a redundant configuration (Database Cluster). (4) Frontend components: established industry practices for high availability of frontend components and associated backend processing components will be leveraged.

Referring now primarily to FIG. 4, to enable interaction and configuration on a wide variety of systems and platforms, using a wide variety of technologies, the system 100 is designed to interface with a wide variety of network entities ("NE") via technology connectors ("TC"), such as the technology connectors depicted in FIG. 4. A network can be made up of many different NE types, with a separate technology connector loaded for each specific NE version and type. A dedicated software module is then implemented for each type of technology supported by the system 100.

Referring still primarily to FIG. 4, various technology connectors of the system 100 will be further described.

The mobile application TC 336 is responsible for facilitating communication between the mobile application 214 running on user devices 112 and the system core functions 248 or system edge functions 252 application components.

This includes application authentication, status information, statistics, as well as application-level data exchange such as proximity information, sensor readings, picture, audio and video information. The mobile application TC 336 is divided into three main modules: the health and statistics module 340, the system maintenance module 344, and the data upload module 348. Each module is responsible for performing specific functions, which are described below.

The health and statistics module 340 is responsible for collecting and analyzing health and usage statistics from the mobile application 214 and associated sensors. The module periodically receives updates from each device, including battery level, network connectivity status, and device usage data. This information is analyzed in real-time, and any anomalies or issues are immediately flagged for further investigation. The health and statistics module 340 also provides an API endpoint that allows administrators to retrieve device health and usage data for monitoring and troubleshooting purposes.

The system maintenance module 344 is responsible for managing the maintenance and upgrading of the mobile application 214. The system maintenance module 344 provides an API endpoint that is periodically polled by each device, allowing administrators to perform maintenance tasks such as upgrading, and running diagnostics. The system maintenance module 344 also provides an API endpoint that enables administrators to remotely configure device settings, including notification settings, and device behavior.

The data upload module 348 provides an API endpoint that allows the mobile application 214 to upload information including device sensor readings, audio and video information, device location data, and information about other devices in proximity.

Referring still to primarily to FIG. 4, the location sensor TC 352 is responsible for facilitating communication between locator beacons 120 and the core or edge backend applications. The location sensor TC 352 is designed to be modular and scalable, allowing for different types of location sensing technologies to be used depending on the specific use case and location accuracy requirements. The location sensor TC 352 provides a flexible interface for integrating different types of location sensors, including Bluetooth, RFID, GPS, automatic visual tracking (e.g., barcode, QR code), and WiFi tracking. The location sensor TC 352 allows location sensors to send periodic reports about the location of all locator tags 140 within their vicinity. These reports are sent to the core or edge backend applications over a communication network using the location sensor TC 352.

The location sensor TC 352 is a component of the edge function backend application that is responsible for keeping track of the location of each user device 112 with the system 100. A tracker may represent a registered user (e.g., student, guardian, security staff, emergency responder, etc.) or unknown individuals being tracked (e.g., visitor). Location information is uploaded to the edge function backend application from locating beacons 120 or user devices 112 devices via the location sensor TC 352. The location sensor TC 352 performs data validation and normalization before storing the information in a location updates table within the database 280.

The location sensor TC 352 runs a location service as a system service, periodically processing the information contained within the location updates table and performing the calculations needed to determine the most accurate location information based on the data that was provided by the locator beacons 120, tracking tags 140, user devices 112, or other locating devices, using triangulation, multilateration, or other techniques. Once calculated by the location sensor, the location data for each user device 112 or tracking tag 140 is stored within the user location table in the database 280. The calculated location is updated every time the location service has new information available related to a given user 116. The user location table also includes a timestamp to keep track of when was the last time the location of each user device 112 or tracking tag 140 was known. Entries are aged out of the table by deleting the rows with a timestamp that is older than a configurable threshold.

The location sensor TC 352 includes three modules, the health and statistics module 356, the system maintenance module 360, and the location update module 364.

The health and statistics module 356 is responsible for collecting and analyzing health and usage statistics from location sensor devices, i.e. locator beacons 120 and locator tags 140. The module periodically receives updates from each device, including battery level, network connectivity status, and device usage data. This information is analyzed in real-time, and any anomalies or issues are immediately flagged for further investigation. The health and statistics module 356 also provides an API endpoint that allows administrators to retrieve device health and usage data for monitoring and troubleshooting purposes.

The system maintenance module 360 is responsible for managing the maintenance and upgrading of location sensor devices. The module provides an API endpoint that is periodically polled by each device, allowing administrators to perform maintenance tasks such as rebooting, upgrading, and running diagnostics. The system maintenance module 360 also provides an API endpoint that enables administrators to remotely configure device settings, including network connectivity, notification settings, and device behavior.

The location update module 364 provides an API endpoint that allows location sensor devices and user devices 112 running the mobile application 214 to periodically upload location information about all user devices that they detect.

Referring still primarily to FIG. 4, the event sensor TC 368 is responsible for facilitating communication between event sensor devices (or their corresponding system) such as gunshot detectors 172 and the core or edge backend application components.

Information from sensors that have been deployed to detect emergency events (e.g., shooting, earthquake, etc.) upload information to the system through the event sensor TC 368 Raw event data is stored within and event updates table after data validation and normalization. From there, it is processed by the event service module 313 (FIG. 3) for further contextual analysis.

For example, in an active-shooter scenario, there may be gunshots detected by multiple sensors. The event service module 313 analyzes the available information to determine an approximate location of the shooter. Information that is derived by the event service module 313 by analyzing the raw detection information stored in the event updates table is stored in an event table 329.

In order to minimize the time required for the solution to react to events detected and reported by the sensor, the event service module 313 uses asynchronous communication with the command and control module 312 to notify it that there is new information in the event table 329 that needs attention.

The event sensor TC 368 is divided into three main modules: the health and statistics module 372, the system maintenance module 376, and the event detection module 380.

The health and statistics module 372 is responsible for collecting and analyzing health and usage statistics from event sensor devices (or their corresponding system). The module periodically receives updates from each device, including battery level, network connectivity status, and device usage data. This information is analyzed in real-time, and any anomalies or issues are immediately flagged for further investigation. The health and statistics module 372 also provides an API endpoint that allows administrators to retrieve device health and usage data for monitoring and troubleshooting purposes.

The system maintenance module 376 is responsible for managing the maintenance and upgrading of event sensor devices. The system maintenance module 376 provides an API endpoint that is periodically polled by each device, allowing administrators to perform maintenance tasks such as rebooting, upgrading, and running diagnostics. The system maintenance module 376 also provides an API endpoint that enables administrators to remotely configure device settings, including network connectivity, notification settings, and device behavior.

The event detection module 380 is responsible for exchanging real-time event notification information between event sensor devices and the core or edge backend applications. The event detection module 380 listens for incoming event information from event sensor devices, normalizes the data and stores it in the database cluster for further processing by the command and control module 312 described herein. An event sensor is a device that is capable of detecting an event that indicates an emergency and communicates information about the event to the core or edge backend application of the system 100 over a communication network using the event sensor TC 368.

Referring still primarily to FIG. 4, a surveillance camera system TC 384 is responsible for facilitating communication between surveillance devices (or their corresponding system) such as security cameras 168 and the core or edge backend application components.

The surveillance camera system TC 384 is divided into three main modules: the health and statistics module 388, the system maintenance module 392, and the surveillance control module 396. Each module is responsible for performing specific functions, which are described below.

The health and statistics module 388 is responsible for collecting and analyzing health and usage statistics from surveillance devices (or their corresponding system). The module periodically receives updates from each device, including network connectivity status. The health and statistics module 388 also provides an API endpoint that allows administrators to retrieve device health and usage data for monitoring and troubleshooting purposes.

The system maintenance module 392 is responsible for managing the maintenance and upgrading of surveillance devices. The module provides an API endpoint that is periodically polled by each device, allowing administrators to perform maintenance tasks such as rebooting, upgrading, and running diagnostics. The system maintenance module 392 also provides an API endpoint that enables administrators to remotely configure device settings, including network connectivity, notification settings, and device behavior.

The surveillance control module 396 is responsible for controlling and exchanging real-time video between surveillance devices and the core or edge backend applications. The module allows the system 100 application to selectively control and view the live video from the surveillance cameras and where possible review historical footage.

Referring still primarily to FIG. 4, the physical access control system TC 400 is responsible for facilitating communication between physical access devices (or their corresponding system) of the remote access systems 134 such as door and window locks and the core or edge backend applications.

The physical access control system TC 400 TC is divided into three main modules: the health and statistics module 404, the system maintenance module 408, and the control module 412. Each module is responsible for performing specific functions, which are described below.

The health and statistics module 404 is responsible for collecting and analyzing health and usage statistics from physical access devices (or their corresponding system). The module periodically receives updates from each device, including network connectivity status. The health and statistics module 404 also provides an API endpoint that allows administrators to retrieve device health and usage data for monitoring and troubleshooting purposes.

The system maintenance module 408 is responsible for managing the maintenance and upgrading of physical access devices. The system maintenance module 408 provides an API endpoint that is periodically polled by each device, allowing administrators to perform maintenance tasks such as rebooting, upgrading, and running diagnostics. The system maintenance module 408 also provides an API endpoint that enables administrators to remotely configure device settings, including network connectivity, notification settings, and device behavior.

Referring still primarily to FIG. 4, the emergency notification display and public address TC 416 is responsible for facilitating communication between emergency notification devices (including but not limited to display screens 176, public address systems 130, fire panels, etc.) and the core or edge backend application components. The emergency notification display and public address TC 416 is divided into three main modules: the health and statistics module 420, the system maintenance module 424, and the event notification module 428. Each module is responsible for performing specific functions, which are described below.

The health and statistics module 420 is responsible for collecting and analyzing health and usage statistics from emergency notification devices. The module periodically receives updates from each device, including battery level, network connectivity status, and device usage data. This information is analyzed in real-time, and any anomalies or issues are immediately flagged for further investigation. The health and statistics module 420 also provides an API endpoint that allows administrators to retrieve device health and usage data for monitoring and troubleshooting purposes.

The system maintenance module 424 is responsible for managing the maintenance and upgrading of emergency notification devices. The module provides an API endpoint that is periodically polled by each device, allowing administrators to perform maintenance tasks such as rebooting, upgrading, and running diagnostics. The system maintenance module 424 also provides an API endpoint that enables administrators to remotely configure device settings, including network connectivity, notification settings, and device behavior.

The event notification module 428 is responsible for exchanging real-time event notification information between emergency notification devices and the core or edge backend applications. The module listens for incoming event poll requests from emergency notification devices and responds with appropriate instructions. The module also issues instructions to each emergency notification device to perform specific actions based on the best action for the given device. Actions include but are not limited to: (1) display a specific message, and (2) produce a specific sound or play a specific audio message.

Referring still primarily to FIG. 4, the notification TC 432 is responsible for facilitating communication between the core or edge backend application components and third party notification systems such as SMS, email, and push notification services. The notification TC 432 is divided into three main modules: the health and statistics module 436, the system maintenance module 440, and the event notification module 444. Each module is responsible for performing specific functions, which are described below.

The health and statistics module 436 is responsible for collecting and analyzing health and usage statistics from the third party services. The module periodically receives updates, including health and network connectivity status, and usage data. This information is analyzed in real-time, and any anomalies or issues are immediately flagged for further investigation. The health and statistics module 436 also provides an API endpoint that allows administrators to retrieve device health and usage data for monitoring and troubleshooting purposes.

The system maintenance module 440 provides an API endpoint allowing administrators to perform maintenance tasks such as rebooting, upgrading, and running diagnostics. The system maintenance module 440 also provides an API endpoint that enables administrators to remotely configure settings, including network connectivity, notification settings, and device behavior.

The event notification module 444 is responsible for exchanging real-time event notification information. The module issues instructions to perform specific actions including send SMS messages, send an email, or send push notifications.

Network entity ("NE") refers to the nodes and systems that are required in order to operate the system 100, such as operations to track the location of the user devices 116, detect an event such as a gunshot, control security cameras 168, or control public address systems 130 or remote access systems 134.

The system 100 system contains at least one NE, but more likely several NEs. Each NE has a specific set of configuration parameters available. The parameters are split into "connection" and "operation" parameters. Connection parameters are defined at NE creation and operation parameters are modified as and when needed during operation.

To enable interaction and configuration on a wide variety of systems and platforms, using a wide variety of technologies, the system 100 is designed to interface with NEs via technology connectors, such as the technology connectors depicted in FIG. 4. A network can be made up of many different NE types, with a separate technology connector loaded for each specific NE version and type. A dedicated software module is then implemented for each type of technology supported by the system 100.

A system administrator can check and modify configuration parameters of a technology connector. A system administrator can create, modify the configuration, and delete a NE. NEs can be gathered in pools, e.g., as per organization, per location area (site), and/or type(s) of function(s).

The system 100 may interact with at least the following NEs: (1) Bluetooth Beacons; (2) Event sensors (Gunshot detection nodes and/or systems); (3) Surveillance camera nodes and/or systems; and (4) Physical access control nodes and/or systems; to name a few.

With respect to the location sensing, the purpose of the location sensing is to provide the system with information regarding the presence of individuals within the coverage area 108. The degree of location accuracy and the corresponding technology used for location sensing depend on the specific use case. For example, when considering an earthquake response, precise locating is not necessarily required; it is sufficient to know whether an individual was inside a building or not. In an active shooting scenario, more accurate location information is needed to determine where a given individual is in relation to the shooter and the nearest exit, in order to direct people towards the nearest exit that is in a direction away from the shooter.

Figure 5:
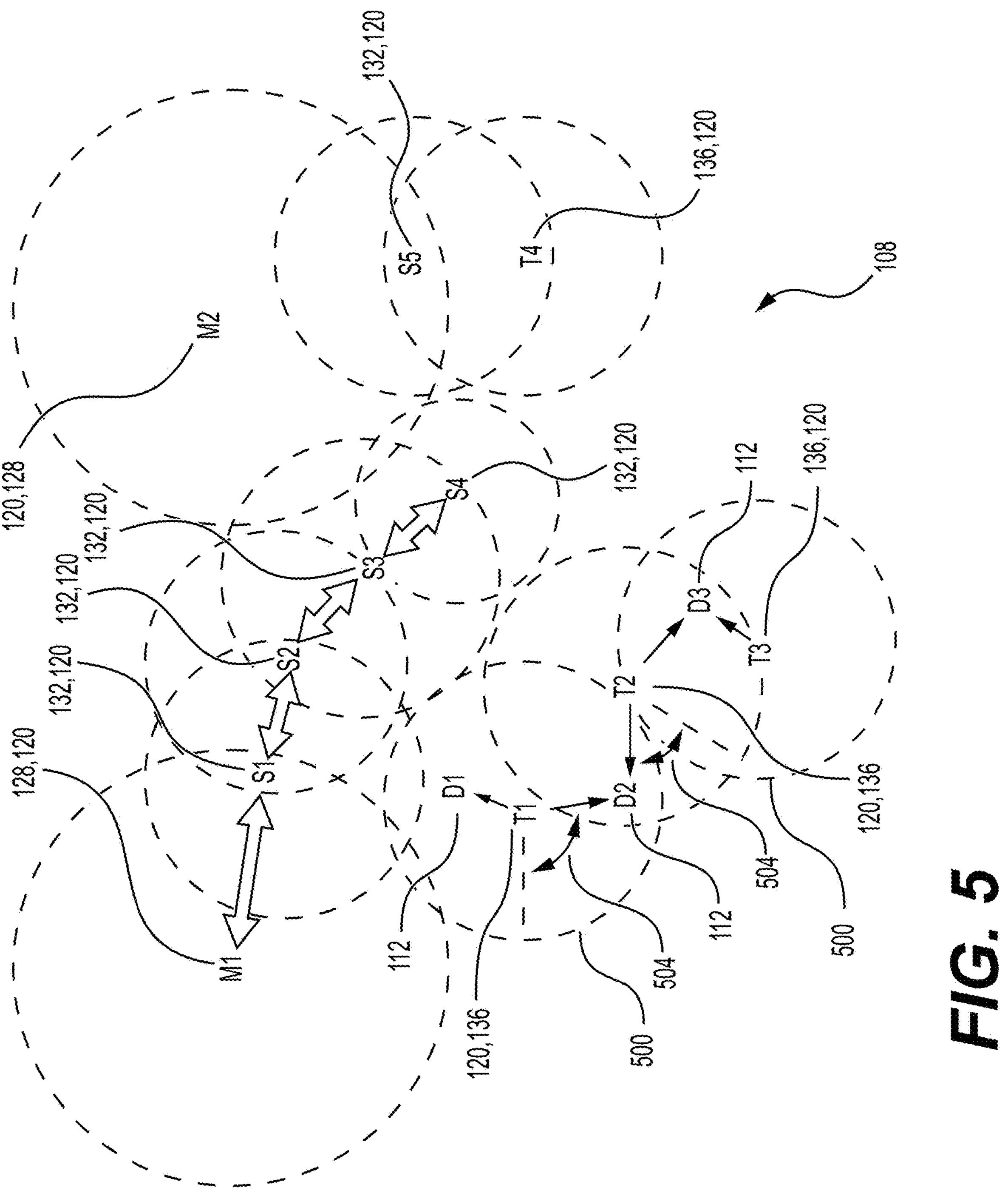
FIG. 5 is a schematic, representation of a coverage area of a system for locating and communicating with persons within a coverage area experiencing an active emergency.

Referring now Primarily to FIG. 5, methods for locating user devices 112 within a coverage area 108 will be discussed. As discussed above, the locator beacons 120 are dispersed throughout the coverage area 108 at the time of installation of the system 100. The locations of each of the locator beacons 120 is noted at the time of installation. In general, the location of a user device 112 or locator tag 140 within the coverage area 108 is able to be determined by the locator beacon 120 signals that are received by the user device 112 or locator tag 140. If a user device 112 or locator tag 140 is within range of a locator beacon 120, the general location of the user device 112 or locator tag 140 is known to be within transmission range of that particular user device 112 or locator tag 140.

In order to properly identify the particular locator beacon 120 that is transmitting to the user device 112 or locator tag 140 the locator beacon 120 must also broadcast its identity.

In one instance the locator beacons 120 are iBeacons or modified iBeacons. iBeacons are devising that are designed to transmit BLUETOOTH signals to be received by cellular phones or other BLUETOOTH enable devices within a certain coverage area. iBeacons transmissions include the transmission of a UUID, a major value, and a minor value.

When the locator beacons 120 of the system 100 are iBeacons or modified iBeacons the characteristics of the iBeacon signal is advantaged to provide a locating solution for user devices 112 or locator tags 140. While, the UUID of an iBeacon is typically used to provide the identity of a particular iBeacon, the system 100 does not use the UUID of the iBeacons for this purposes. Instead, as described more fully below, the UUID of all locator beacons 120 or at least all tracking beacons 136 is set for the same value.

The major value and minor value of the iBeacon locator beacons 120, however, is used for unique purposes for each locator beacon 120 within the coverage area 108. As mentioned above, the major and minor values are already part of the standard transmission of an iBeacon locator beacon 120. Therefore, the system 100 utilizes the unique major and minor values associated with each of the iBeacon tracker beacons 136 to provide the identity of a particular iBeacon tracker beacon 136 when the signal from that iBeacon tracker beacon 136 is received by the user devices 112 or locator tags 140. The major and minor values for smart beacons 128 are used for a different purpose. As described below, the major and minor values for smart beacons 128 are used in the swarm beacon protocol, as described below.

With respect to the UUID's of the iBeacon locator beacons 120, a beacon swarm protocol will be now further described. The beacon swarm protocol overcomes known limitations of user devices 112 that are cellular phones, and particularly of user devices 112 operating the IOS operating system.

One of the challenges with using the Bluetooth radio on a smartphone to detect the presence of a user device 112 in a particular location is that mobile device operating systems such as iOS and Android impose significant restrictions on the capabilities of the mobile application 214 when the user device 112 is not actively running the mobile application 214 in the foreground. For example, iOS does not allow the mobile application 214 to scan the environment and produce a list of Bluetooth devices that are in the area when the mobile application 214 is running in the background or when the screen of the user device 112 is locked. Similarly, the mobile application 214 has no control over what Bluetooth frames can be transmitted when the mobile application 214 is in background mode, which makes it difficult to detect smartphones that are not running a dedicated mobile application 214 in the foreground.

These and other challenges can be overcome by leveraging iBeacon technology to create a hierarchical swarm of iBeacon locator beacons 120 that work in conjunction with the mobile application 214 installed on user devices 112 to allow tracking of mobile phones even when the mobile application 214 is running in the background or the device screen is locked.

The main benefit of using iBeacons is that mobile operating systems provide mechanisms to detect proximity to an iBeacon device even when the mobile application 214 is not running in the foreground.

On iOS, the mobile application 214 can register a set of iBeacon UUID's (maximum 20) that the mobile application 214 wishes to be notified about by the operating system when they are detected. When the mobile application 214 registers such a UUID listed with the operating system, and the phone gets close enough to an iBeacon to detect the UUID, the mobile application 214 is triggered in background mode and given a few seconds of runtime during which the mobile application 214 can perform a limited set of actions such as ranging (calculating the distance from iBeacons in the vicinity), collecting phone sensor data, getting the GPS location, and communicating with a core application among others.

There are some additional limitations imposed on the mobile application 214 by the operating system. For example, the mobile application 214 will only be notified when it enters a region (defined by the fact that the OS can detect a particular iBeacon UUID) or exits a region (defined by the fact that the OS can no longer detect a particular iBeacon UUID). As long as a single UUID associated with a particular region is visible, the OS will not trigger the mobile application 214, making it challenging to deploy multiple iBeacons over a large geographic area in order to track the location of mobile devices, since the mobile application 214 will not receive updates in the background unless the user device 112 exits one region or enters a new one. It is also not feasible to simply deploy a very large number of iBeacons with unique UUIDs since the OS only allows up to 20 to be registered at any given time.

One way to overcome this is to have iBeacon locator beacons 120 periodically change the UUID they transmit. This way the user device 112 operating the mobile application 214 will behave as though the user device 112 has exited one region and entered a new one, thereby triggering the mobile application 214 and giving the mobile application 214 a few seconds of background mode execution during which the mobile application 214 can collect and report information to the core application as previously described.

In order to get a fairly accurate estimate of the location of the user device 112 from the iBeacon ranging data, multiple iBeacon locator beacons 120 are deployed within the coverage area 108. This is also required in order to ensure that there are no "dead zones" which are areas in which no iBeacon locator beacons 120 are within range of the user device 112. This, however, poses a challenge given the fact a dense iBeacon locator beacons 120 deployment means that there will be signal overlap, and that the operating system will not trigger background mode execution unless the user device 112 has been deemed to have exited a region or entered a new region as determined by visible iBeacon locator beacons 120. It is therefore useful to synchronize all of the iBeacon locator beacons 120 within a coverage area 108 so they all switch from one UUID to the next at substantially the same time.

For example, if a user device 112 is within range of four iBeacon locator beacons 120, even though the user device 112 may be stationary, and the application is not actively in use (e.g. the user 116 is using a different application, or the screen of the user device 112 is locked), when the iBeacon locator beacons 120 switch from transmitting UUID1 to transmitting UUID2, the operating system will assume that the user device 112 has moved from one region to another region, thereby triggering background execution and allowing the mobile application 214 to collect information transmitted by the iBeacon locator beacons 120 and upload the information to the core application of the system 100.

There are a few challenges with such an approach in practice. For one, the iBeacon locator beacons 120 need some way of synchronizing with each other to ensure that they are all transmitting the same UUID at the same time. This can be accomplished using various off-the-shelf methods such as synchronization with a centralized time source, and/or including a high-precision real-time clock on each device, but such approaches increase both the cost and power consumption of each iBeacon locator beacons 120. In practical terms, the synchronization does not need to be extremely precise, as long as there are long enough windows of time during which all of the iBeacon locator beacons 120 are transmitting the same UUID.

Having the iBeacon locator beacons 120 constantly performing this UUID rotation would result in the mobile application 214 being triggered to run every time the UUID changes, whether it is relevant to collect information from the mobile phone or not. For privacy reasons and to conserves battery power of the device involved in the system 100, it is beneficial to only collect user device 112 locations during an active emergency situation. It would be advantageous to conserve battery power of the iBeacon locator beacons 120 devices and the user devices 112 by only performing such a UUID rotation when there is a reason to collect information from the user devices 112, such as when there is an active shooter incident in progress and it is necessary to retrieve location and other information from as many user devices 112 as possible.

These challenges are addressed by the beacon swarm solution described in connection with FIG. 5, which allows a collection of iBeacon locator beacons 120 deployed in a geographic area to self-synchronize and self-organize into a hierarchical swarm whose behavior is dictated by higher-ranking (superior) members. The collection of iBeacon locator beacons 120 includes tracking beacons 136, smart beacons 132, and master beacons 128. A tracking beacon 136, in some embodiments, is an off-the-shelf iBeacon that transmits a constant UUID value. The smart beacons 132, in some embodiments, are custom iBeacons running the beacon swarm logic described below. The master beacons 128 are devices with a Bluetooth radio and IP connectivity used to control the beacon swarm from a core application of the system 100. It should be understood that distinction between the smart beacon 132 and the tracking beacon 136 may or may not be a physical distinction. For example the smart beacon 132 may be a distinct separate physical device from the tracking beacon 132. However, in some embodiments, the smart beacon 132 and the tracking beacon 132 may be the same physical device. In some embodiments this is accomplished by utilizing an iBeacon that has two distinct MAC addresses and appears, to receiving devices, to be broadcast from a distinct smart beacon 132 and a distinct tracking beacon 136. In this implementation, the same physical device behaves as if it was two different locator beacons 120.

Each iBeacon locator beacon 120 may be in a particular state and may transition from one state to another state. In one embodiment, the states of the iBeacon locator beacons 120 are idle state, incident state, and settle state.

In the idle state, the tracking beacons 136 transmit the static UUID value they have been configured with; smart beacons 132 periodically scan the environment listening for specific UUIDs; and master beacons 128 periodically transmit a particular UUID to indicate the state is idle.

In the incident state, when triggered, the core applications of the system 100 inform the master beacons 128 that the state has changed to the incident state. Since the master beacons 128 have IP connectivity, this may be done through a wireless network signal. The master beacons 128 then switch from transmitting the idle state UUID to transmitting an Incident-UUID (described below). Furthermore, the actions include tracking beacons 136 transmitting the static UUID value they have been configured with, the smart beacons 132 transmitting the Incident-UUID (described below); the smart beacons 132 periodically scan the environment to determine their rank and synchronize with their peers; and master beacons 128 periodically transmit iBeacon advertisements using the same rotating set of UUIDs as the smart beacons 132.

In the settle state the core applications of the system 100 inform the master beacons 128 that the state has changed to the settle state. Moreover, the following actions are taken: tracking beacons 136 transmit the static UUID value they have been configured with; master beacons 128 transmit a specific UUID (called the settle-UUID) to indicate that the swarm needs to settle back into idle state; and the smart beacons 132 who receive the settle-UUID from superior peers and are in incident state enter settle state and transmit the settle-UUID for a predetermined amount of time, before transitioning to idle state.

Master beacons 128 and smart beacons 132 can transmit different UUIDs depending on the situation. In incident mode, master beacons 128 and smart beacons 132 rotate through a pre-determined set of UUIDs, these are referred to as the incident-UUIDs. In idle mode, master beacons 128 transmit the idle-UUID to notify all smart beacons 132 in the vicinity that there is no need for them to transmit anything other than beacon swarm synchronization frames. In settle state, smart beacons 132 transmit a settle-UUID to inform their peers that it is time to transition to the idle state.

Master beacons 128 are in communication with the core applications of the system 100, typically using TCP/IP, although other protocols (e.g. LoRaWAN) are possible. This communication is what allows the core application to notify the master beacons 128 that they need to transition from idle state; need to transmit the idle-UUID to incident state; need to transmit rotating through the set of incident-UUIDs.

In some embodiments, not all smart beacons 132 are within proximity of the master beacon 128. The number of hops between the smart beacon 132 and the nearest master beacon 128 is what determines the rank of smart beacons 132.

FIG. 5 presents a beacon swarm ranking example. The beacon swarm protocol allows each of the smart beacons 132 within the swarm to determine its rank based the other smart beacons 132 it is able to detect around it. The protocol also allows smart beacons 132 within a swarm to synchronize with each other in a way that optimizes power utilization and does not require a centralized clock or time source.

Smart beacons 132 that are within range of the master beacon 128 are said to have rank 1, and are considered the highest ranking smart beacon 132. Smart beacons 132 that are not within range of any master beacon 128, but are within range of at least one Rank 1 smart beacon 132 are said to have rank 2. A rank 1 smart beacon 132 is considered a superior beacon, conversely the rank 2 smart beacon 132 is a subordinate.

FIG. 5 illustrates a number of smart beacons 132 that are part of a swarm. Smart beacon 132 S1 is within range of master beacon 128 M1. Since the smart beacon 132 S1 is within range of a master beacon 128, the rank of smart beacon 132 S1 is 1. Smart beacon 132 S2 is within range of smart beacon 132 S1. Upon receiving a broadcast from the smart beacon 132 S1 indicating that smart beacon 132 S1 is a rank 1 smart beacon 132 and without receiving a broadcast from a master beacon 128, the smart beacon 132 S2 sets it rank as one higher than that of smart beacon 132 S1, i.e. smart beacon 132 S2 sets its rank to 2. At the same time, the smart beacon 132 S2 adopts the appropriate UUID based on the signal received from smart beacon 132 S1. The same process continues along the chain including smart beacons 132 S3 and S4, which will set their ranks at 3 and 4, respectively.

In some embodiments, the data contained within an iBeacon locator beacon frame 448 includes: Bytes 0 to 2 contain values that are standard BLE flags; Bytes 3 to 8 contain fixed values defined by Apple that uniquely identify iBeacon frames from other types of BLE frames; Bytes 9-24 are the UUID (Universally Unique Identifier) of the iBeacon locator beacon 120; Bytes 25-26 (Major) contain a user-defined major value; Bytes 27-28 (Minor) contain a user-defined minor value; Byte 29 contains the expected signal power at a distance of 1 meter from the iBeacon locator beacons 120.

In some embodiments, when exciting the swarm protocol the following applies: (1) The UUID portion of the iBeacon frame 448 is used to convey state information (e.g. idle vs incident vs settle). The major and minor values are used to convey rank and synchronization information; (2) Smart beacons 132 that receive an iBeacon frame from master beacons 128 beacon assigns themself rank 1; (3) All other smart beacons 132 assign themselves a rank value that is one larger than the smallest value of all the peer smart beacons 132 within range; (4) The smaller the integer value of rank, the higher the logical rank of smart beacons 132; and (5) Superior smart beacons 132 always influence the behavior of subordinate smart beacons 132.

For illustration purposes, assume that a particular swarm is configured in such a way that the incident-UUID set contains four UUIDs (UUID1, UUID2, UUID3 and UUID4) and in incident state it is desired that each of these UUIDs is transmitted for 12 seconds before switching to the next UUID. Each of the 12 second intervals is called a Window, so window-1 lasts for 12 seconds during which all smart beacons 132 transmit UUID1, followed by window-2 which lasts for 12 seconds during which all smart beacons 132 transmit UUID2, followed by window-3 which lasts for 12 seconds during which all smart beacons 132 transmit UUID3, followed by window-4 which lasts for 12 seconds during which all smart beacons 132 transmit UUID4. After window-4 the swarm cycles back to window-1 and the process repeats until a master beacon 128 instructs otherwise.

Each window can be further sub-divided into slots. Continuing with the previous example, a 12-second window can be thought of as consisting of 12 1-second slots. A slot does not necessarily need to be one second in duration.

Figures 6, 7:
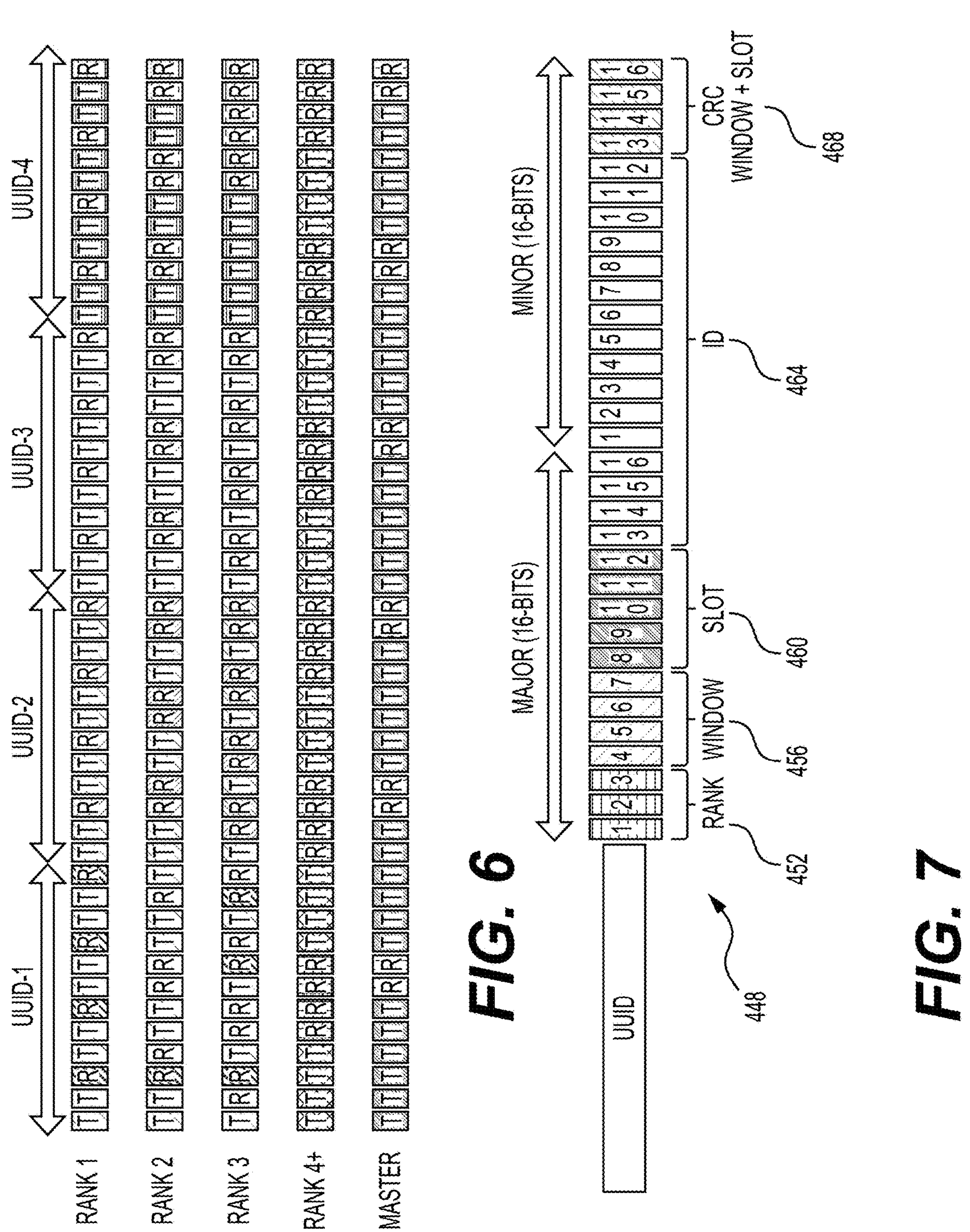
FIG. 6 is a schematic, representation of a coordinated broadcast and transmission schedule of locator beacons of an illustrative embodiment of a system for locating and communicating with persons within a coverage area experiencing an active emergency.
FIG. 7 is a schematic, representation of a data frame of a locator beacon of an illustrative embodiment of a system for locating and communicating with persons within a coverage area experiencing an active emergency.

Referring now primarily to FIG. 6, in order for a user device 112 to detect a locator beacon 120, it is not necessary for the locator beacon 120 to be transmitting continuously. Typically, locator beacons 120 do not transmit advertisements all the time, but rather periodically transmit an advertisement frame on a defined (often configurable) frequency.

The beacon swarm protocol extends this concept to switch the smart beacons 132 between transmit mode and receive mode based on the current slot. In transmit mode master beacons 128 and smart beacons 132 transmit iBeacon advertisements that contain the UUID that is appropriate for the given state and window. In receive mode, smart beacons 132 scan the airwaves for superior smart beacons 132 within range so they can extract the rank, window, and slot values from the iBeacon advertisements, derive their own rank as a result, and synchronize their current window and slot values with those of a superior smart beacon 132.

In order for this mechanism to work, in one illustrative embodiment, smart beacons 132 within a particular area should not inadvertently become perfectly synchronized in such a way that they all go into receive mode at the exact same time, since the smart beacons 132 will not be able to detect each other. In order to prevent this situation, the beacon swarm protocol defines a duty cycle, whereby smart beacons 132 will alternate between transmit mode and receive mode from one slot to another following a duty cycle that is defined by its rank as illustrated in FIG. 6.

Each box containing the letter T or R in FIG. 6 corresponds to a slot within the given UUID window. A slot marked with T means that the smart beacons 132 with that rank will be in transmit mode during that slot, while a slot marked with R means that smart beacons 132 with that rank will be in receive mode during that slot. The assigned duty cycles ensure that there will always be an opportunity for a subordinate smart beacons 132 to detect superior smart beacons 132 in its vicinity and adjust its rank, window, and slot based on the values it receives from its superior. The mechanism for achieving that is described below.

Reference is now made primarily to FIG. 7. The smart beacon frame 448 includes of a number of fields. The beacon swarm protocol leverages the UUID to convey state, and the major and minor values to convey rank and timing information.

In some embodiments, the 32 bits that are available for the major and minor values are divided as follows for the beacon swarm protocol: 3 bits 452 convey the rank of the transmitting smart beacon 132; 4 bits 456 convey the current window that the transmitting smart beacon 132 is in; 5 bits 460 convey the slot within the current window the transmitting smart beacon 132 is in; 16 bits 464 carry an identifier that can be used to identify the transmitting smart beacon 132 within the specific coverage area 108, and this may also be used to convey other application-specific information if needed (e.g. replay protection information); and 4 bits 468 are used to calculate a checksum to ensure the data integrity of the frame.

Figure 8:
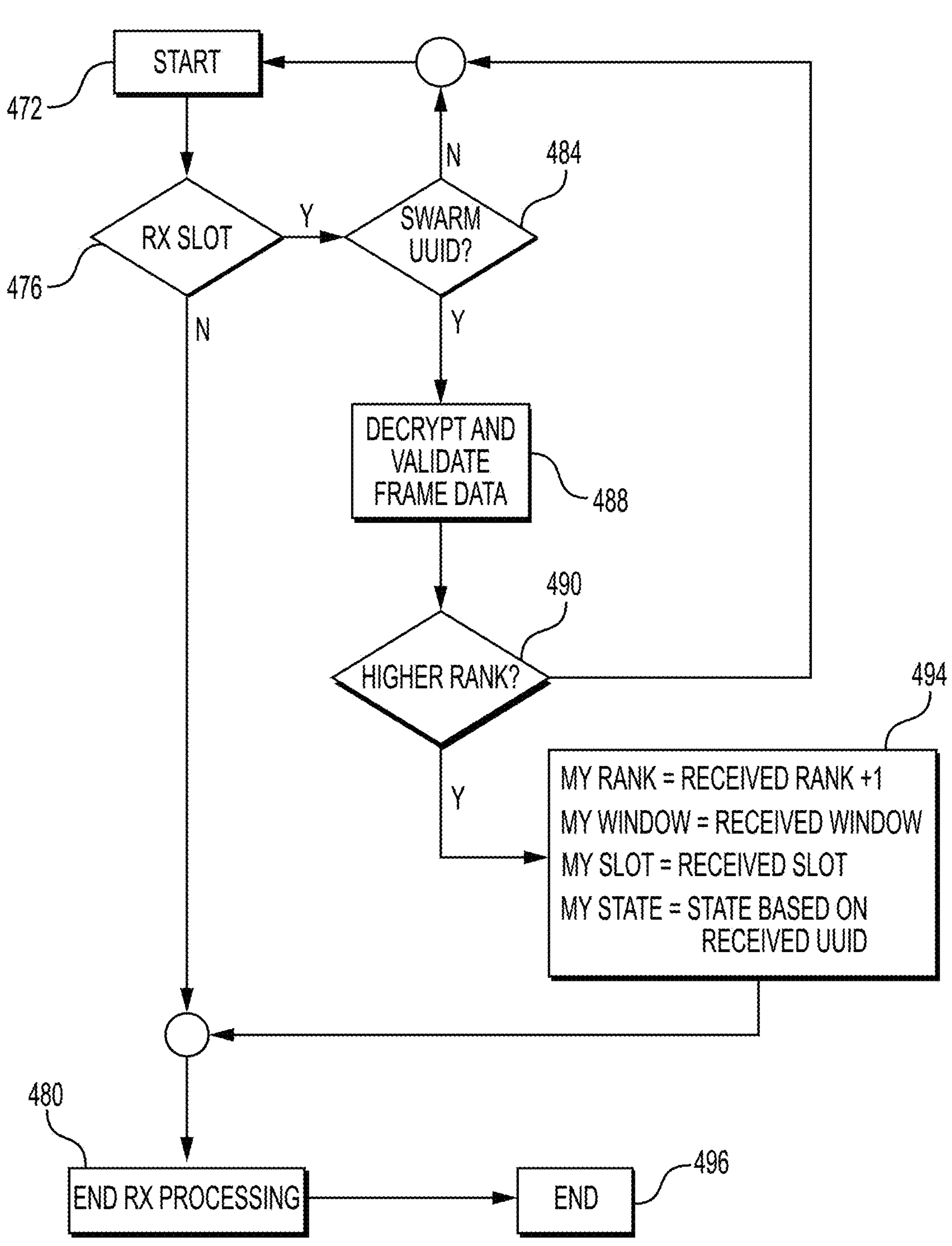
FIG. 8 is a schematic, representation of a method for coordinating broadcasts and rankings of locator beacons of an illustrative embodiment of a system for locating and communicating with persons within a coverage area experiencing an active emergency.

Referring now primarily to FIG. 8, an illustrative process flow for the receiving process of a beacon swarm member is presented. When master beacon 128 or smart beacon 132 is in a slot that is designated as a transmit slot based on the beacon's rank and associated duty cycle (FIG. 6), the master beacon 128 or smart beacon 132 transmits the window UUID with the values of its rank, window, and slot encoded within the major and minor values as described above. When smart beacon 132 is in a slot that is designated as a receive slot based on its rank and associated duty cycle, it scans the BLE frequencies for any frames 448 (FIG. 7) from swarm peers. If the smart beacon 132 receives a frame 448 from a swarm peer, it extracts the values for rank, windows and slot, and updates its own values if the peer has a higher rank.

The process starts at 472. After starting the process the smart beacon 132, at step 476, queries whether or not it is in a transmit period. If the answer to the query is no, then the process goes to step 480 at which point the receiving process is ended. The process then ends at 496. If the answer to the query at step 476 is yes, meaning that it is a designated time for the smart beacon 132 to receive, the process goes to step 484. At step 484, the receiving smart beacon 132 processes the incoming locator beacon 120 frames 448. The smart beacon 132 determines if the incoming frame 448 indicates that it was delivered from a swarm locator beacon 120. If the answer to the query is NO, the process returns to the start 472. If the answer to the query is YES, then the process continues to step 448 at which point the smart beacon 132 decrypts and validates the incoming frame 448. The process then proceeds to step 490, at which point the smart beacon 132 examines the data from the incoming frame 448 and queries whether the data from the incoming frame 448 indicates that the frame 448 was received from a superior locator beacon 120. If the answer is No, the process returns to the start 472. If the answer to the query is YES, then the process continues to step 494. At step 494 the smart beacon 132 sets its rank as one plus the rank of the locator beacon 120 from which the frame 448 was sent; sets its window the same as the window of the incoming frame 448, sets its slot the same as the slot from the incoming frame 448, and sets it state based on the UUID of the incoming frame 448. The process then continues to step 480, where the receiving process is ended and then onto the end 496.

By implementing the receive process illustrated in FIG. 8, swarm members achieve the following: The swarm self-assigns rank to each swarm member based on which peers each swarm member is able to detect and superior swarm members implicitly control the state, rank, and synchronization of subordinate swarm members.

The frame 448 data is encrypted and therefore the process involves a decryption step 488. Encryption prevents rogue Bluetooth devices from being able to influence the behavior of the swarm. Locator beacons 120 that are members of a swarm are configured with an encryption key that can be used to encrypt and decrypt the major and minor value portions of the frame. Additional measures to protect against replay attacks can also be included following standard cryptographic techniques.

While generally receiving BLE frames requires less energy than transmitting them, the process outlined above requires computational steps to process each received frame, examine the UUID, and then proceed with the decryption and processing steps. Given the very large number of Bluetooth enabled devices in any given environment these days, smart beacons 132 will typically process several received frames 448 that will eventually be discarded. Members of a swarm will also process many frames 448 from subordinates which are ultimately ignored. All of this processing requires CPU cycles which consume a significant amount of energy and therefore significantly reduce the lifespan for battery operated beacons. In order to mitigate this, the beacon swarm protocol ends the receive processing as soon as the frame 488 is received from a superior smart beacon 132. Once the rank, window, and slot values have been assigned from at least one superior smart beacons 132, there is no longer a need to continue processing received frames 448, even if the beacon is within a receive slot. This significantly reduces power consumption associated with CPU cycles, allowing locator beacons 120 to run on a battery for up to several years.

Transitioning between idle and incident state is controlled by master beacon 128 based on instructions received over a network connection to the core application of the system 100. When the core application indicates that the swarm should transition to idle state, the master beacon 128 are instructed to and begin transmitting the settle-UUID. The rest of the swarm propagates this settle-UUID to allow all swarm members to receive the notification and eventually switch to idle state.

In some embodiments, this is achieved as follows: master beacons 128 begin transmitting the settle-UUID; rank 1 smart beacons 132 that are within range of master beacons 128 and that are in incident state, switch to settle state and transmit the settle-UUID for a fixed amount of time before transitioning to idle state; and subordinate smart beacons 132 in incident state who receive the settle-UUID from a superior switch to settle state and transmit the settle-UUID for a fixed amount of time before transitioning to idle state.

Smart beacon frames 448 carrying the settle-UUID still encode the rank, window and slot values of the transmitting smart beacons 132 in the major and minor vales since this the rank is needed in order to decide whether the frame was received from a superior or not. When smart beacons 132 receive a settle-UUID from a superior they switch to settle state, begin transmitting the settle-UUID, and set a timer which will trigger a transition to the idle state upon its expiry.

There are other considerations in tracking the location of individuals using their user devices 112 in addition to using the beacon swarm. The other components include the mobile application 214 that has been installed on the user's mobile device 112 and has been properly initialized as follows: (1) The application user follows an enrolment procedure to enroll the mobile device with the system 100 core application; (2) The application prompts the user to grant the required permissions which include access to location information, periodic updates, background execution and access to the device hardware such as camera, microphone and sensors; (3) The application registers with the core application so it can receive push notifications; and (4) The application registers the set of incident-UUIDs with the mobile device OS or starts a background process to scan for incident-UUIDs.

With these preconditions met, when the beacon swarm enters incident state and begins transmitting the incident-UUIDs, as describe above, every time the UUID changes from one window to the next, the mobile application 214 will be triggered by the mobile OS (or background scanning process) and have the opportunity to perform some operations in the background. At this point, the mobile application 214 will be able to receive frames 448 from tracking beacons 136, which includes identification information of the tracking beacon 136 that transmitted the signal. As described above, this information is used to locate the user device 112 operating the mobile application 112. At the same time, the user device 112 will be able to receive and process similar information received from locator tags 140, as described above.

It should be noted that this is possible even if the user 116 is not actively running the application and even if the screen is locked. Although there are significant restrictions on what a mobile application 214 is permitted to do when the screen is locked or when the application is in background mode, there are sufficient permissions that enable the mobile application 214 to collect information such as ranging locator beacons 120 to determine the distance from locator beacons 120 within range and collect GPS location information and access some of the sensors or hardware devices on the user device 112.

Reference is now made again primarily to FIG. 5, various possible ranging and locating techniques of the system 100 will be further discussed. FIG. 5 presents an illustrative embodiment of a coverage area 108 including a number of locator beacons 120. This includes tracking beacons 136 designated as T1, T2, and T3. Each of tracking beacons 136 T1, T2, and T3 has its own transmission range indicated as circular areas 500. For illustrative purposes three user devices 112 designated as D1, D2, and D3 are present within the coverage area The rough estimates of the locations of user device 112 D1, D2, and D3 are able to be determined based on signals that each receives from the tracker beacons 136. For example, the user device 112 D1 is known to be within the range of tracker beacon 136 T1 and no other tracking beacons 136; the user device 112 D2 is known to be in a location that is within transmission range of tracking beacons 136 T1 and T2 and no other tracking beacons 136; and the user device 112 D3 is known to be in a location that is within transmission range of tracking beacons 136 T2 and T3 and no other tracking beacons 136.

While the above procedures may be used to locate the user devices 112 within a certain area with a certain degree of certainty, ranging the user devices 112 from the tracking beacons 136 may provide further information that improves the determination of the location of user devices 112.

In one illustrative method ranging a user device 112, the operating system of the user device 112 may use signal strength information to determine, at least, the relative distance differences of the user devices 112 from various locator beacons 120. In some instances, the user device 112 obtains or monitors the signal strength of an incoming transmission and correlates that signal strength to the relative distance from the transmitting locator beacons 120.

For example, in FIG. 5, the user device 112 D3 is within transmission range of both tracking beacons 136 T2 and T3, and is, therefore, receiving frames 448 from both tracking beacon 136 T2 and T3. However, since user device 112 D3 is closer to the tracking beacon 136 T3 than the tracking beacon 136 T2, the signal strength of the signal received by user device 112 D3 from the tracking beacon 136 T3 may be stronger than the strength of the signal received by user device 112 D3 from the tracking beacon 136 T2. The system 100 or applications on the user device 112 may be able to use this signal strength information to label the user device 112 D3 as being "near" tracking beacon 136 T3 and an "intermediate" distance from the tracking beacon 136 T2. Such relative ranging information may be further processed, e.g.

compared to a coverage area 108 map, to further refine the location of the user device 112 D3 within the coverage area 108.

In addition, the ranging information for a particular user device 112 may be further refined utilizing information received in the frame 448 of a locator beacon 120. For example, a locator beacon 120 may transmit data that indicates an expected signal strength from an indicated distance. The system 100 may utilize this information in correlation with the actual received signal strength to further refine the determination of the location of a particular user device 112.

In addition, the system 100 may be able to further range user devices 112 by using angle of arrival information from one or more locator beacons 120. This technique is described in relation to ranging user device 112 D2 of FIG. 6. The user device 112 D2 is within range of tracking beacon 136 T1 and T2. The user device 112 D2 may have the capability to determine an angle of arrival 504 of the transmission received from each of the tracking beacons 136 T1 and T2. The angle of arrival 504 may further be used or processed by the operating system of the user device 112 or the system 100 in general to further refine the determination of the location of the user device 112 D2.

When multiple tracking beacons 136 or smart beacons 132 are detected and ranged by the user devices 112, additional mathematical approaches can be leveraged to further improve the accuracy of the location estimate.

In some embodiments, the system 100 may rely on GPS information periodically reported by the user device 112 with the mobile application 214 installed, without the need for additional locating beacons 120 or tracking tags 140. In addition, it may not always be necessary to track the location of user devices 112 at all times, it may be sufficient to track location only when the individual is within the coverage area 108. The mobile application 214 may therefore support various modes of reporting, such as: (1) Periodic: in this mode the mobile application 214 periodically reports GPS and other sensor information to the core or edge backend applications of the system 100 by performing an HTTPS POST operation to the mobile application 214 TC 336; (2) Geofenced periodic: in this mode, the mobile application 214 will periodically report GPS and other sensor information to the core or edge backend applications of the system 100, but only while the user device 112 is within the boundaries of the coverage area 108, as determined by the GPS coordinates; or (3) Geofenced presence: in this mode, the mobile application 214 will only report transitions in and out of the coverage area 108. When the user device 112 enters the coverage area 108, an HTTPS POST to the mobile application 214 TC 336 may be used to notify the core or edge backend applications of the system 100 that the user device 112 is within the coverage area 108. No further updates will be provided as long as the user device 112 remains within the coverage area 108. When the mobile application 214 determines that the user device 112 has left the coverage area 108, another HTTPS POST operation to the mobile application 214 TC 336 may be issued to notify the core or edge backend applications of the system 100 that the user has left the coverage zone.

As another illustrative example, a wearable Bluetooth device such as a smartwatch, or a Bluetooth dongle that can be attached to an article of clothing may also be used in conjunction with Bluetooth Proximity Sensors to track the location of individuals. The operation is similar to the locator tag 140 process described above, where the device detects Bluetooth transmissions made by locator beacons 120. Information that may be collected includes the MAC address, the signal RSSI and if available the angle of arrival.

Figure 9:
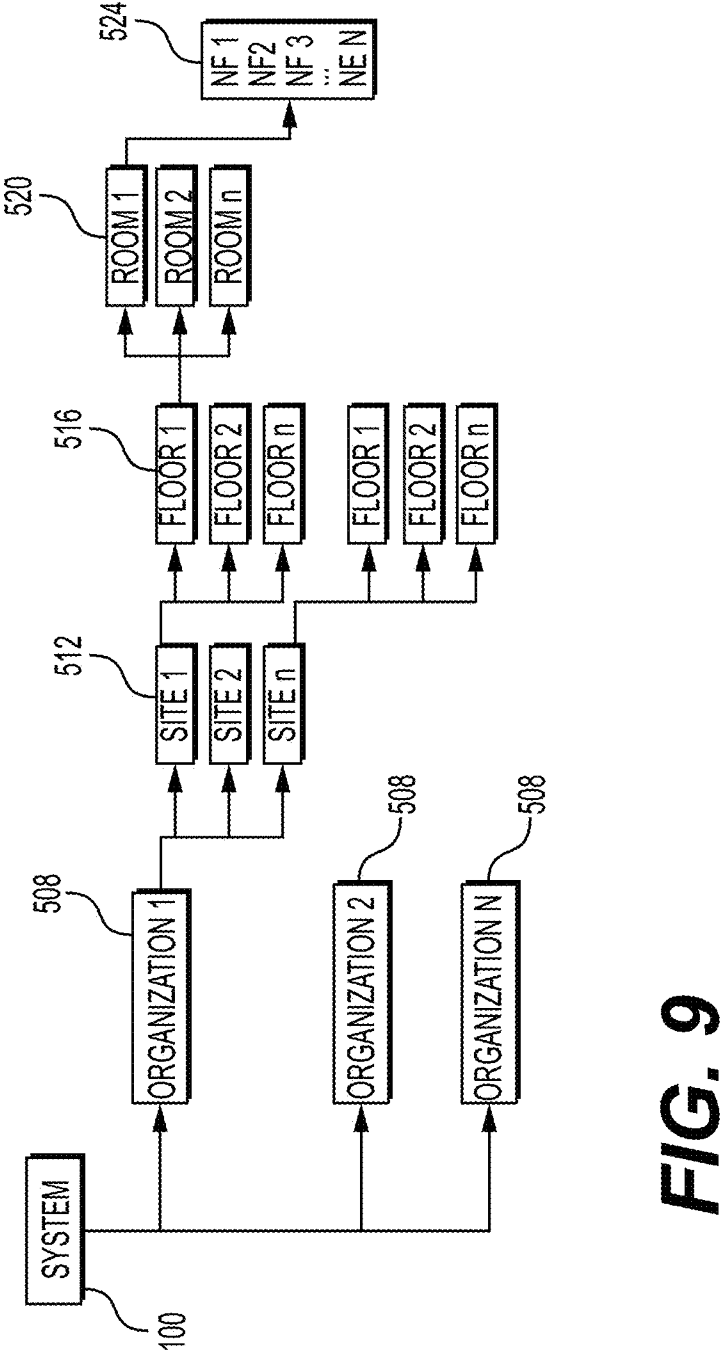
FIG. 9 is a schematic, representation of a hierarchical organization of deployments of an illustrative embodiment of a system for locating and communicating with persons within a coverage area experiencing an active emergency.

Turning now primarily to FIG. 9 and discussing organization management, the system 100 is implemented with the concept of an "organization" where an organization represents the entity's location or building where the system 100 is deployed. The system 100 allows a system administrator to dynamically create one or multiple organizations within the system 100. Data for each organization is only accessible to that specific organization's administrators and operators and is kept hidden from other organizations. All the nodes and objects including the users 116, user devices 112, locator beacons 120, locator tags 140, other NEs, and other third party systems for the organization are linked to each specific organization.

An organization may be made up of one or multiple "Sites" each representing a specific "building" with each having one or multiple "floors" with each floor having one or multiple "rooms" and other sub-locations. To provide maximum flexibility due to the various building and organizational layouts, the system 100 offers a unique approach for defining the "organization" and their corresponding sub-structure. This is done by allowing the system administrator to define locations at any hierarchy level using a parent-child approach where each object is given a "type" and is associated to its immediate "parent". The user can define as many locations as needed while the system associates the lowest child to its immediate and other higher level parents creating the organization hierarchy. Network Entities (NEs) can be linked to any of the locations at any level.

An illustrative organization hierarchy of this type is depicted in FIG. 9, where each organization 508 is registered with the system 100. In the illustrative example of FIG. 9, there are 1-N organizations 508. For illustrative purposes, Organization 508 1 sublevels are further depicted. These sublevels include 1-N sites 512, 1-n floors 516 for each site 512, 1-n rooms 520 for each floor 516, and 1n network entities 524 for each room 520. This approach results in a tree type hierarchy representing the organization's structure as shown in FIG. 9. It should be understood that the organization structure depicted in FIG. 9 is illustrative and other structures can be used.

Creating a new organization 508 or a sub-structure may require the following preliminary information: (1) Identifier (mandatory)—a unique system generated idetifier; (2) Name (mandatory)—Free text field for the location name, and multiple locations may have the same name; (3) Type (mandatory)—Choice Oranization|Campus Site|Floor-|Room|Hallway|Stairs}; (4) Sub-type (optional)—Choice {Lobby|Reception|Class|Storage}; (5) Parent (mandatory)—Choice {None|list of existing location Identifiers}; (6) Full Path (mandatory)—system generated hierarchy full path which includes the child's name, the immediate and other higher level Parent/s (separated by /)—for example "Organization 1/Site 1/Floor 1/Room 1"; (7) Address (conditional)—mandatory for "Campus"; (8) Ordinal (conditional)—mandatory for "Floor"—represents the levels position within the total levels in the building (integer)—or example, −1 represents the 1st under the ground floor, 0 represents the ground floor and 1 represents the 1st floor above the ground floor; (9) Floorplan (conditional)—mandatory for "Floor". Allows user to upload the floorplan file and view it; (10) Coordinates (GPS)—GPS coordinates of each site; and (11) Contact (conditional)—mandatory for Organization, Campus and Site: (a) Last name, (b) First name, (c) Address, Phone number, and (e) Email address.

With respect to floor plan management, this may included as an aspect of the system 100 that allows the system 100 to offer intelligent evacuation instructions to the end-users within the coverage zone. The feature utilizes tools for rendering and uploading true to scale geo-coordinated floor maps into the system 100 system. A floorplan is associated to a pre-configured organization "floor". During the organization management process a system administrator is responsible for uploading the floorplans and linking the organization's pre-configured structure to the map.

The floorplan may be used for the following: (1) The system 100 front-end application for the system administration, organization administration and operation, and first-responder operators; (2) locator beacons 120 and network entity positioning; (3) route management and route suggestion; (4) camera positioning, management and control; (5) physical access node positioning, management and control; (6) user location tracking; (7) emergency notification display positioning, management and control; and (8) possible other usages.

The system 100 also may address route management. The system 100 may use a third party commercial mapping tool to define all possible routes from any point on a floor map to any of the exit points on the floor and potentially to a "safe zone". As much as possible, the routes to exit an area may match and may be in-line with any existing emergency exit routes which the organization has already in place.

Once the routes are pre-defined using the commercial mapping tool, they may be imported into the system 100 solution for utilization. The routes may only be used during emergency incidents (and drills) when the end-user within the vicinity of the incident is informed of the possible routes to exit the floor.

The system 100 may allow the system 100 or a backend user 246 (with appropriate privileges) to either automatically or manually specify areas or exit points on a map to avoid.

The routes can be viewed on the floor map through the system 100 user interface and a backend user 246 may designate areas on the map and exit points as being "unavailable" or "to be avoided". Such designation may result in the system 100 to visually highlight those areas or exit points on the floor map during an incident.

Turning now to end-user management, the system 100 may address registration, deregistration, and audits among other aspects. The system 100 system manages various users 116 for location tracking and user devices 112, and location tags 140. Each device has a specific set of configuration parameters available. The parameters are split into "connection" and "operation" parameters.

The system 100 is designed to interface with the supported end devices via reliable and efficient APIs. These APIs are designed as RESTful web services, accessible via HTTPS requests.

The system and organization administrators oversee the end-user management in the system 100 solution.

With respect to end user registration, user 116 registration is typically initiated by the end-user's user device 112. Once the user 116 has installed the system 100 mobile application 214 on his/her smartphone, the mobile application 214 will initiate a connection to the system 100 core or edge backend applications to register and authenticate itself. As soon as the authentication is done successfully, the user device 112 unique identifiers and other required information are sent to the system 100 core or edge components. The user device 112 is considered registered after which the system 100 starts accepting data from the user device 112. Different flows for user 116 registration (also referred to as enrollment) are envisioned depending on the systems in use for a particular organization.

The information stored in the core database that is associated with a particular user 116 may include the following: Login username/password, User first and last name, Email address, Mobile number, Address, Organization, and Device UUID.

With respect to user 116 deregistration, the user 116 deregistration is done by the system 100 or organization administrators which results in the deletion of the user 116 profile from the system 100. Deregistration can also be initiated by the user 116 itself when the user 116 uninstalls the mobile application 214 from the user device 112.

With respect to the backend users 246 of the system 100, a number of backend users 246 are contemplated. Examples include the following: (1) System administrator for management of Organizations and Organization administrators, management of floorplans, management of the system 100 system administrators, management of end-users and NEs, administration and operation of the system 100 platform; (2) Organization administrator for management of end-users, management of organization's operation users, management of organization and floorplans, exit route configuration, management of notification, instruction and alerts—the organization administrators are gathered under unique organization, all having same level of access based on their profile; (3) Organization operation user for management of floorplans, exit route configuration, management and configuration of notification, instruction and alerts, control of the surveillance cameras and physical access doors—the organization operators are gathered under unique organization, all having same level of access based on their profile; and (3) First responder operation user for control of the surveillance cameras and physical access doors. The organization operators are gathered under unique organization, all having same level of access based on their profile. At creation of a backend user 246 account, the backend users246 is assigned a profile setting his/her privileges. Different rights in the system may be assigned to each backend users 246.

Further information regarding the technology connectors, modules, and applications that may form part of the system 100 will be further discussed.

With respect to media service, the Media Service is a component of the edge function backend application that is responsible for reception and keeping track of the media (audio, picture, video) from the end-user that is being tracked by the solution. An end-user with the system 100 mobile app has the ability to submit media as part of the incident reporting procedure. The media file and relevant information is uploaded to the edge function backend application by means of the mobile application TC 336.

The mobile application TC 336 performs data validation and normalization before storing the information in a Media table within the database.

A media service runs as a system service, periodically processing the information contained within a media table and where needed making the data available for other processes.

The media table also includes a timestamp to keep track of the uploaded media. Entries are aged out of the table by deleting the rows with a timestamp that is older than a configurable threshold.

Figure 10:
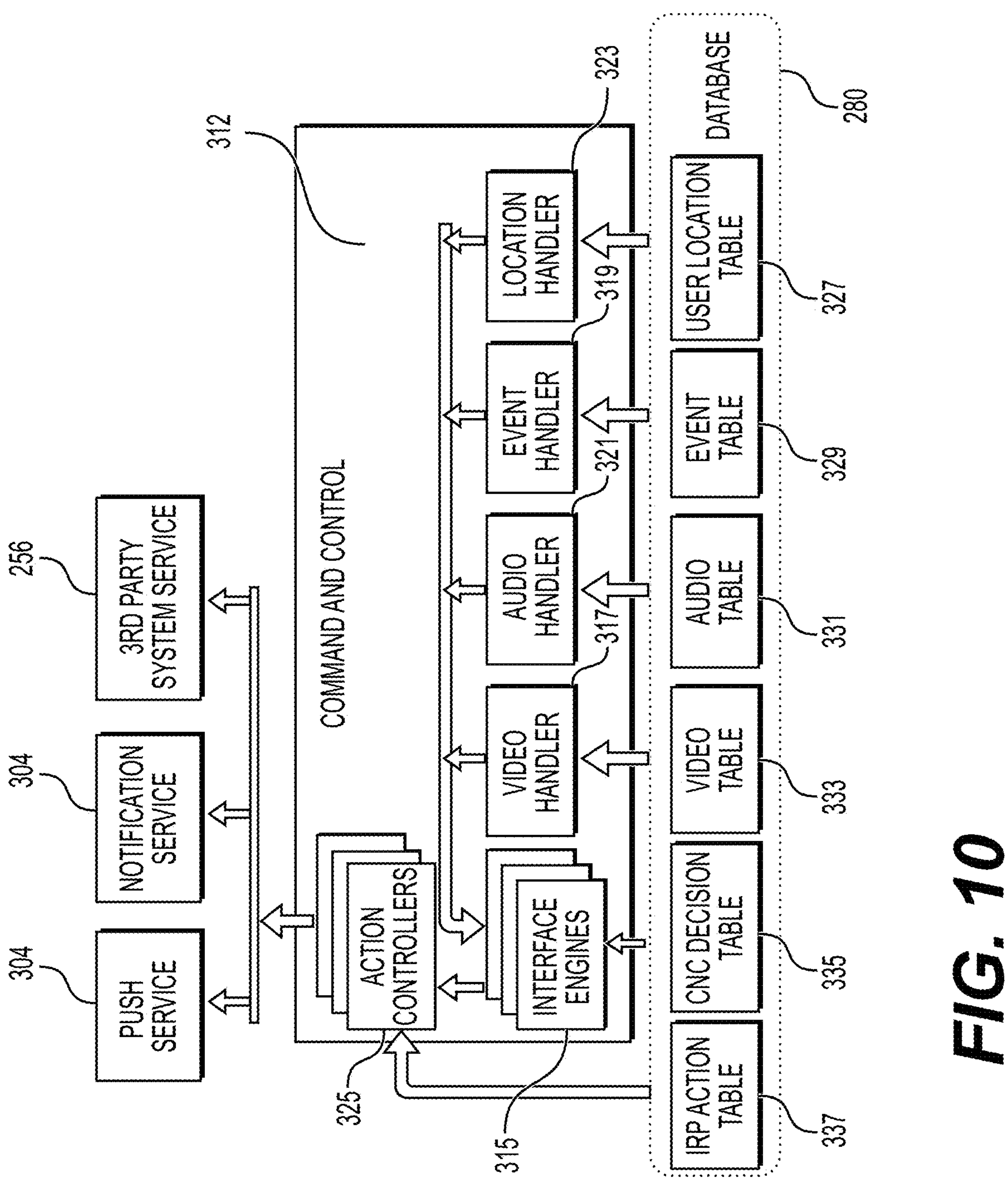
FIG. 10 is schematic, representative depiction of modules, services, and applications that form a portion of an illustrative embodiment of a system for locating and communicating with persons within a coverage area experiencing an active emergency.

With reference now primarily to FIG. 10, the command and control module 312 will be further discussed. The command and control module 312 is where the system 100 application operational intelligence is located. It is a collection of sub-components that are capable of processing the data that is provided to the edge function through the available APIs to extract operationally actionable information (e.g. a gunshot has been detected near coordinates [X,Y,H]), components that are capable of making inferences based on the extracted information (e.g., there is an active shooter emergency in progress), and components that are capable of making decisions (e.g. notify authorities, trigger alarm) and controlling other solution components as needed (e.g. display appropriate instructions on emergency notification devices, putting the site under lockdown, etc.).

Inference engines 315 are a collection of components within the command and control module 312 that draw conclusions about a situation based on available information. Different inference engine 315 instances may arrive at the same conclusion using different sources of information (e.g., audio, video, user notification) and using different approaches (e.g., user-driven, algorithmic, machine learning, etc.).

Relevant information is provided to the collection of inference engines 315 from a set of handlers that know how to process a particular type of data and provide a specific type of inference engine 315 with relevant information. Relevant information may be stored in a command and control decision table 335 or a IRP table 337 of the database 280.

Video handlers 317 within the command and control module 312 are capable of processing video streams to detect relevant information e.g. an armed individual has been detected. The video handler 317 may be a third party component outside of the command and control module 312. In the latter situation, the third party system may simply provide an event notification which is managed by an event handler 319 component. The video handlers 317 may store relevant data in a video table 333 contained within the database 280.

Audio handlers 321 within the command and control module 312 are capable of processing audio streams to detect relevant information e.g. people are screaming, and calling for help. The audio handler 321 may be a third party component outside of the command and control module 312. In the latter situation, the third party system may simply provide an event notification which is managed by an event handler 319 component. Audio handlers may store data within an audio table 331.

The event handlers 319 within the command and control module 312 are capable of processing event information, e.g. gunshot detection notifications and provide inference engines 315 with relevant information (e.g. type of weapon, number of shots, time of last shot).

Location handlers 323 are capable of processing location information to detect relevant information and provide it to inference engines 315 (e.g. individuals near detected shots are running).

Using all of the available information, the inference engines 315 trigger action controllers 325 within the command and control module 312 initiating the pre-defined actions including Incident Response Plans (IRP) based on the outputs of the decision making process to help get individuals to safety and assist first responders in containing the emergency in a safe and timely manner.

There are different actions to initiate based on incident types which interact with different components (i.e., notification services module 304, push services module 308, etc.) and perform specific actions.

In addition to the IRPs, the action controllers 325 also initiate instructions towards the system 100 organization operator front-end application to display incident related information and also allow for specific backend users 246 controls which can be executed manually. These includes: display of the organization floor map where the incident is reported at; display of the camera feed; allowing the backend user 246 to overwrite the exit routes; or allowing the backend user 246 to send additional notifications, to name a few.

With respect to incident response plan management, the Incident Response Plan Management (IRPM) is an administrative function which allows for pre-defining the Incident Response Plan (IRP) and procedures based on the location and the incident type. The IRPs are triggered by the command and control module 312 action controllers 325 component.

Through the IRPM the backend users 246 can define series of actions such as the following to be executed automatically once an incident is detected (note that the type of action depends on the incident type): initiate an alarm on the system 100 application UI; clear the alarm and remove it from the UI; start a live stream of the nearest security cameras 168 to the incident; stop the live stream of the security cameras 168; send mass or targeted notifications (pre-defined SMS, pre-defined push notifications) to users 116: send unique messages and guidance to specific groups of users 116 based on the incident type or location; send notification (pre-defined SMS, pre-defined push notifications) to security dispatch personnel; send unique messages and guidance to security or first responders based on the incident type, location, or the user type; initiate notifications with relevant actionable information towards the display screens 176; initiate audible alarms through the integrated PA system or on display screens 176 or on user devices 112; initiate the lockdown or lockout procedures; activate or deactivate connected safety physical access doors and other hardware; initiate unlock procedures; unlock the connected safety physical access doors and other hardware; turn on overhead strobes; turn off the overhead strobes; transmit smart evacuation route to user devices 112; or clear the event and stop all notifications, to name a few.

The notification services module 304 is the component of the Incident Response Plan Management responsible for initiating notifications that need to be sent out as part of the emergency and incident response plans. The service is designed to be flexible and scalable, with the ability to handle multiple types of notifications depending on the specific use case.

The notification services module 304 can be built using a microservices architecture, with each microservice responsible for a specific type of notification. For example, there may be a separate microservice for active shooting notifications, fire notifications, weather alerts, and other types of emergency notifications. Each microservice is designed to be modular and self-contained, allowing for easy maintenance and updates.

The notification services module 304 is designed to integrate with other system components, such as the display screens 176 and the mobile application 214, to ensure that notifications are delivered in a timely and effective manner. The notification services module 304 triggers from the command and control module 312. Once a trigger is received, the appropriate microservice is activated to initiate the notification process.

The notification services module 304 utilizes various notification channels to reach different stakeholders, including text messages, email, push notifications, voice messages, and communication with display screens 176. The service is designed to be configurable, allowing administrators to define the content, frequency, and targets for each notification. For example, an active shooting notification may include a message to be displayed on the display screens 176 directing people to the nearest safe exit, along with a separate notification to the mobile application 214 informing users 116 that there is an active shooter situation and to follow the instructions on the display screens 176 near them or that there is an active shooter situation along with a real-time map of the shooter location.

The notification services module 304 is designed to be highly available and fault-tolerant, with multiple redundant servers deployed across different geographic locations. Load balancing and auto-scaling are used to ensure that the service can handle high traffic volumes and remain available even during peak usage periods. Comprehensive monitoring and logging are also implemented, allowing backend users 246 to track service performance and quickly identify and troubleshoot any issues.

Turning now to the user 116 location and media data collection and retention aspects of an illustrative embodiment of the system 100, the location information from the user devices 112 and locator tags 140 are sent to the edge function backend using the location sensor TC 352. The data is stored in a user location table 327 within the edge function database 280. The location data is updated every time the location service module 314 has new information available for a given user 112. The user location table 327 also includes a timestamp to keep track of when was the last time the location of each device was known. Entries are aged out of the user location table 327 by deleting the rows with a timestamp that is older than a configurable threshold.

The system 100 proposes monitoring tools in accordance with the type of UI that backend users 246 are connected to. A system administration UI may include the followings tools: licenses; processes; alarms; measurements; health indicators; or statistics, to name a few. A service operation GUI may include the following tools: processes; alarms; or statistics, to name a few.

With respect to alarms, when backend users 246 select the alarm monitoring tool, the UI queries the system 100 for all alarms raised in the system that the backend user 246 is allowed to access to. Upon successful response, the UI may display an alarms grid. For each alarm of the grid, the backend user 246 may access: details about the alarm; raise date; object identifier; alarm name; event type; probable cause; severity; specific problem; acknowledgement date and author; remarks; acknowledge the alarm if not already acknowledged; or clear the alarm, to name a few.

When the backend users 246 acknowledge or clear an alarm, the UI forwards the request to the system 100 which acknowledges or rejects the order in accordance with the privilege of the backend users 246.

With respect to measurements, when backend users 246 select a measurements monitoring tool, the UI queries the system 100 for all measurements defined in the system 100. Upon successful response, the UI may display a measurements grid. For each measurement in the grid, the user can: get details about the measurement; measurement identifier; measurement state; category of measurement information to collect; start date and time; end date and time; granularity period; suspend or resume the measurement; or change the granularity period of the measurement, to name a few.

With respect to health indicators, when backend users 246 select a health indicators monitoring tool, the UI queries the system 100 for indicators of health of the system 100. Upon successful response, the UI may display a health grid with following indicators: internal services (processes) in failure; network connectors unexpectedly unavailable; web front-ends unexpectedly unavailable; external authentication servers unexpectedly unavailable; CPU usage; CPU temperature; memory usage; disk usage; or network interface usage, to name a few.

When the health indicators monitoring tool is open, indicators are refreshed periodically as per tool settings.

The system 100 core and edge functions may generate the following applicative alarms regarding the health indicators.

| Alarm | Severity |
|---|---|
| Service failure | Critical |
| Network Connector connection failure | Threshold based |
| Service web front-end connection failure | Threshold based |
| Front-end connection failure | Threshold based |
| External authentication server connection failure | Threshold based |
| External authentication server reported failure | Type of error based |
| Database read/write operation failure | Major |
| Unsuccessful user login | Warning |
| Unsuccessful server login | Warning |
| Maximum session load reached | Threshold based |
| Scheduled job failure | Major |
| Certificate about to expire | Warning |
| Monitored Third Party element disconnected | Major |
| Data export failure | Warning |

Turning now to the application interfaces, there may be various APIs that enable communication between the core or edge components of the system 100 and front-end components, such as user devices 112. The APIs may be designed as RESTful web services, accessible via HTTPS requests. The APIs may be built using industry-standard protocols and frameworks, including JSON for data exchange, OAuth2 for authentication, and HTTPS for secure communication, for example.

To ensure performance and scalability, APIs are designed to be highly available and fault tolerant. The APIs may be hosted on a distributed cloud infrastructure, with multiple redundant servers deployed across different geographic locations. Load balancing and auto-scaling may be used to ensure that each API can handle high traffic volumes and remain available even during peak usage periods. Comprehensive monitoring and logging may also be implemented, allowing backend users 246 to track API performance and quickly identify and troubleshoot any issues.

Application interfaces may implement the APIs, notifications, and data transfer mechanisms to or from the various the system 100 front-end applications.

Such interfaces may be responsible for: delivering event and push notifications and instructions to end-users/devices/emergency notification screens; delivering location tracking information to relevant front-end applications; ensuring the security and completeness of data using secure transmission mechanisms, and buffers (if applicable) and retransmission schemes, to name a few.

The mobile application 214 may include components that provide user interfaces and functionality to allow users 116 to interface and interact with the system 100. The mobile application 214 side of the system 100 supports different user 116 roles (e.g., student, guardian, school administrative staff, school security staff, law enforcement, etc.) that each may have access to different GUIs or applications to provide users 116 with access to specific views and data based on their role.

The mobile application 214 may provide a number of different functions that depend not only on the use case and technologies that are used, but also on the role of the individual that owns the smartphone. For example, in an active shooter emergency response use case, the individual who is running the mobile application 214 may have one of the following roles: community member (e.g. in a school setting this would include all the students); staff (e.g. teachers, professors, custodial staff, school administrators, etc.); security personnel (e.g. campus security staff); or law enforcement (e.g. local/state police), to name a few.

The mobile application 214 may operate on mobile devices such as but not limited to Android, iPhone and Windows phones.

Figure 11:
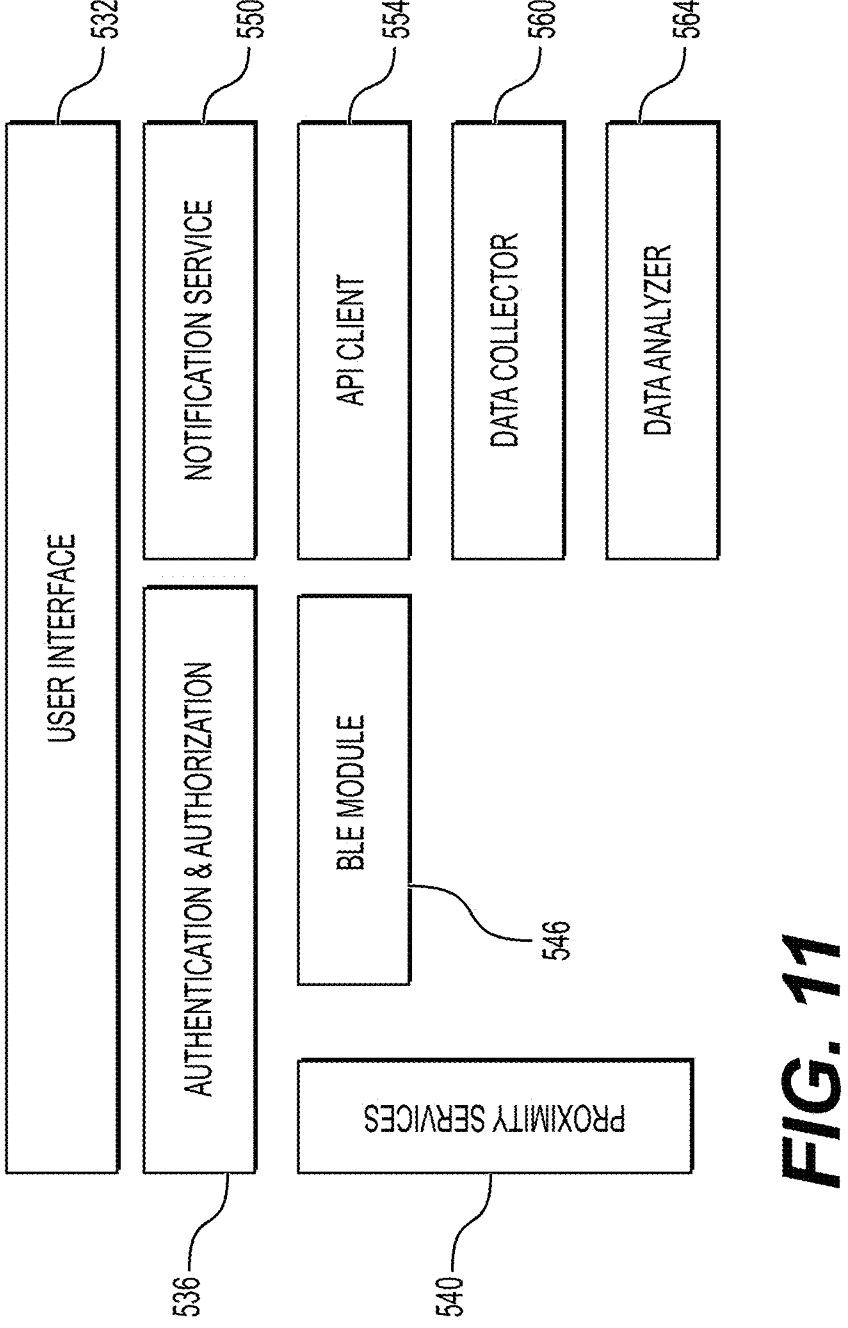
FIG. 11 is a schematic, representation of modules, services, and APIs of a mobile application of an illustrative embodiment of a system for locating and communicating with persons within a coverage area experiencing an active emergency.

FIG. 11 illustrates the main components of the mobile application 214 in one illustrative embodiment. A user interface 532 provides the required elements (forms, buttons, pop-up notifications, etc.) required to allow the user 116 to interact with the mobile application 214 as needed.

A proximity services module 540 is an abstract component that includes of one or more implementations. The proximity services module 540 provides the services that allow user devices 112 that are in proximity of each other to detect each other. Specific instances of a proximity services module 540 include but are not limited to the following: a BLE Module: this module is a proximity service that uses a Bluetooth radio on the user device 112 to periodically scan for nearby devices, and to advertise itself to nearby devices An authentication and authorization component 536 is responsible for interacting with the authentication and authorization server 104 components of the system 100 to ensure that only authorized users 112 are able to access, register and interact with the system 100. This may be done through integration with an external directory database or other solutions depending on the specific environment.

A notification service component 550 may be used to trigger notifications to the user device 112. The notification service component 550 may generate different kinds of notifications including generating an audible alert (in the form of a tone or speech), causing the phone to vibrate or start ringing, generating messages that are shown as smartphone notifications, starting an application or more. The notification service component 550 may also be the component that receives notifications from the core or edge backend applications of the system 100, which may instruct the mobile application 214 to take specific actions.

An API client 554 may implement logic that allows the mobile application 214 to communicate with the core or edge backend applications of the system. The API client 554 may allow the mobile application 214 to perform functions such as: send periodic diagnostic and status information to the core and/or edge backend application; send recorded picture, audio and video information to the edge backend application; send information collected from the sensors that are available in the device such as accelerometer, pressure, gyro/orientation, magnetometer, etc.; send information about the GPS location of the device; or send information about other devices that have been detected by the Proximity Services, to name a few.

A data collector component 560 may gather data from the various input devices and sensors that are available on the user device 112, including the microphone, camera, sensors, gyroscope, magnetometer, temperature, light, pressure, proximity etc. A data analyzer 564 evaluates data that has been collected by the data collector component 560 to determine what action needs to be taken based on the information. Possible actions include but are not limited to: send the raw or processed data to the core and/or edge backend application using the API Client; trigger a notification to the smartphone user using the Notification Service; trigger a phone call to a particular service (security staff, 911 etc.); trigger an SMS message to one or more configured phone numbers; or switch the application from Periodic Mode to Streaming Mode, to name a few.

There are different types of evaluations that may be performed by the data analyzer 564 depending on the nature of the information. For example, for audio information, the data analyzer 564 examines the content of the audio to detect pre-determined keywords like "shooter", "help", "call 911" to detect whether there is an event of interest. For motion and gyroscopic data, the data analyzer 564 examines the readings to determine physical characteristics of the individual, e.g., walking, running, immobile, lying down, drop, etc.

From the perspective of sending information to the core or edge backend applications of the system 100, the mobile application 214 may operate in one of two modes:

In periodic mode, the mobile application 214 is monitoring the environment, and the data analyzer 564 examines all available information to determine if there are any indicators that there is an emergency underway. Data is periodically transmitted to the core or edge backend application of the system 100 on a configurable time interval. If such triggers are detected indicating that there is an emergency situation, the mobile application 214 is switched to streaming mode.

In streaming mode, the mobile application 214 streams data to the core or edge backend applications in near-real-time. This allows moment-by-moment information to be collected by the core or edge backend application that can be used to: determine the nature and scope of the emergency; determine the best course of action for each individual based on their location; control all display screens 176 to provide the most appropriate directions based on the location of the user device 112; send notifications to all stakeholders; provide raw or processed information to security personnel, law enforcement and other first responders; and retain streamed information for legal use and response review operations, to name a few.

In addition to the background processing provided for location tracking, the mobile application 214 may provide a number of features that allow users 116 to provide and receive actionable, personalized information about different types of incidents to enable security staff and emergency personnel to efficiently collect information to enable them to respond to the needs of individuals at risk, and provide the users 116 with updates to help them get to safety or get the assistance they require in the shortest possible time.

In some instances, the users 116 may be able to use the mobile application 214 to select an action to perform from an available option, including: reporting an incident to security staff and authorities through the system 100; requesting a follow-me action when the user 116 feels unsafe (e.g. walking from the campus to the parking lot at night); initiating an audio-recording session (e.g. when the user 116 is being harassed); or requesting assistance (e.g. medical emergency, threat of violence, accident), to name a few.

In some instances, the users 116 may be able to use the mobile application 214 to report different types of incidents. For example, users 116 may be able to select a gun icon to report a gunshot or active shooter; a fire icon to report a fire; or a medical icon to report a medical emergency, to name a few. A direction icon may be used to provide the system 100 with further information about the location of the incident with relation to current position of the user 116/

When the user 116 presses any of the incident buttons, information about the current position of the user 116 and the nature of the incident are transmitted to the system 100 core application and security or emergency response personnel may be notified.

In some instances, when the user 116 presses the direction icon, the user 116 is presented with a screen that has a camera view and a map view. By pointing the camera view in the direction of the incident, the mobile application 214 can use the magnetometer to determine the direction of the incident being reported in relation to the user 116. When the user 116 presses a button that corresponds to the type of incident, the following information may be communicated from the mobile application 214 to the core of the system 100: the position of the user device 112 used to report the incident; the orientation of the issue in relation to the user device 112; or a photo taken from the camera of the user device 112 the moment the user 116 pressed the incident button, to name a few.

In some instances, a user 116 may use the mobile application 214 to press a record button to run a recording application. While the operation is in progress the mobile application 214 records audio or video from the device microphone or camera and uploads it the core application of the system, where it is stored and can later be accessed.

In some instances, the user 116 may select a follow me button to activate a follow me operation. The mobile application 214 may, in response, send a follow-me notification to the core application of the system 100 and to any contacts the user has previously defined as follow-me contacts to notify them of the operation. While the follow-me operation is active, the mobile application 214 may send frequent location updates to the core application of the system, along with other device sensor readings such as accelerometer, gyroscope, activity sensor, and GPS among others.

In some instances, the user 116 may select a help me button to activate a help me operation. When the user presses the help-me button, the mobile application 214 may send a notification to the core application of the system indicating that the user 116 has requested assistance or the user 116 may be presented with another screen where the user 116 can provide additional information on the nature of the assistance that is required. Available options may include: threat of violence; accident; or medical emergency to name a few.

If the user presses any of the available buttons, an additional notification may be sent by the mobile application 214 to the core of the system 100.

When the user 116 accesses the mobile application 214 during an incident such as an active shooter, the mobile application 214 may provide the core with frequent updates containing the current location of the user 116 or user device 112 and other information collected from the sensors available on the user device 112. The mobile application 214 may present the user 116 with information on the safest evacuation route, if one is available, or instructions on the safest course of action given their current position and information about the threat. Evacuation routing may be provided using automated route planning based on the location of the user 116 relative to the threat and available escape routes. Manual override may also be available to allow security personnel to modify the automated escape route based on knowledge they may have that is not available to the routing logic.

Turning now to the operator front end application 332 (FIG. 2) of the system 100. The operator front end application 332 may be a web-based application that provides operator users with the features and functions needed to interact with the system 100. The operator front end application 332 may be the same mobile application 214 that users 112 use to interact with the system 100 or it may be a stand alone application that is only made available to operator users. Operator users are people who have operator access to the front end of the system 100, i.e. by a through a user device 116 with the authority to perform operator functions. The specific features that are able to be accessed, and the types of data that is visible to the operator users depends on the role of and authorization level of the operator users. Specific details depend on the application use-case (e.g., active-shooter vs tornado vs earthquake, etc.).

The operator front end application 332 may include an authentication and authorization component that is responsible for interacting with the system 100 to ensure that only authorized users 116 are able to access the system.

The operator front end application 332 may include a security component that is responsible for applying security functions within the operator front end application 332. Security functions may include monitoring requests for unusual patterns to detect possible intrusion or unauthorized access, ensuring that the appropriate network policies are in place and being enforced, or running periodic consistency checks, to name a few.

The operator front end application 332 may include a presentation component that is responsible for providing the information needed to display information to the operator user. This can be in the form of HTML, or data (e.g., JSON objects) that are used by a client application that is responsible for rendering the corresponding user interface objects.

The operator front end application 332 may include a business logic layer that implements the main functionality of the operator front end application. For example, when the operator user interacts with graphical user interface elements defined in the presentation layer, this may trigger certain actions that are handled by the business logic layer. If the business logic layer needs to interact with any of the data stored in the database 280, it may do so through a data access component which implements the methods needed to perform database queries.

The system may also include the administration front end application 328 that may be a web-based application that provides system administrators with the features and functions needed to interact with the system 100. The specific features that are able to be accessed, and the types of data that is visible to the system administrators depend on their role and authorization level. Specific details depend on the application use-case (e.g., active-shooter vs tornado vs earthquake, etc.). The general design of the administration front end application 328 may be very similar to the operator front end application 332. The components of the administration front end application 328 may be the same as those described in relation to the operator front end application 332.

The system may also include the security staff application 219 that is available to security team members related to a coverage area 108 as part of the system 100. Security team members may be able to use the security staff application 219 to visualize on a map of the coverage area 108 the evacuation progress and the location of security team members in the field and groups of individuals that are present.

Security team members may use the security staff application 219 to interact with other security team members either by SMS or by phone call. In the event that a situation results in the need to modify the emergency evacuation procedure, security team members can provide manual inputs that will be immediately factored into the evacuation algorithm and communicated as needed, for example: to close an exit and reroute people in a more appropriate direction and to reroute a group of individuals within a specific zone towards an alternative exit for them to be rescued by first responders.

The master beacons 128 broadcast iBeacon frames that carry two types of information: (1) whether there is an active incident or not and (2) information needed by the locator beacons to control their state and synchronize their clocks.

Using the locator beacons 120 the system 100 tracks the location of people who (a) have a mobile phone with the mobile application installed or (b) are carrying locator tag 140 such as a wearable tracker like a smart-badge.

The backend application control master beacons 128, telling master beacons 128 whether there is an active incident or not. When there is an active incident, the master beacons 128 begin transmitting a set of UUIDs following the beacon swarm protocol as described herein.

These UUIDs trigger the beacon swarm (which is the collection of smart beacons 132) to also begin rotating the same set of UUIDs in a coordinated manner.

These UUIDs from the smart beacons 132 trigger the mobile application 214 and locator tags 140 to periodically scan for a different UUID that is transmitted by all of the tracking beacons 136. Every single tracking beacon 136 transmits the same UUID all of the time when transmitting, but in addition to the UUID, each tracking beacon 136 also includes in the transmission unique identifiers that identify the location the tracking beacons 136 are in.

The mobile application 214 receives the UUID and location signals from all the nearby the tracking beacons 136 and analyzes the information to determine which one is the closest, and report that information back to the core application.

The locator tags 140 also receive the UUID and location signals from the tracking beacons 136, but locator tags 140 cannot directly communicate with the core application since locator tags 140 only have bluetooth, so they transmit yet another type of bluetooth signal that identifies which of the tracking beacons 136 are closest to the locator tags 140. This transmission is picked up by nearby master beacons 128 and mobile application 214 instances which relay the information back to the core.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" may be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" or communication link may be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or user) device may include a computing device capable of sending or receiving signals, such as via a wired or a wireless network. A client device may, for example, include a desktop computer or a portable device, such as a cellular telephone, a smart phone (iPhone or Android or something else), a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device or mobile device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Google® Gmail, Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram®, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

Although the present disclosure and its advantages have been disclosed in the context of certain illustrative, non-limiting embodiments, it should be understood that various changes, substitutions, permutations, and alterations can be made without departing from the scope of the disclosure as defined by the claims. It will be appreciated that any feature that is described in a connection to any one embodiment may also be applicable to any other embodiment.

What is claimed:

1. A system for locating users in an active emergency situation comprising:

a plurality of user devices located within a coverage area, wherein each user device is capable of transmitting and receiving wireless signals;

a computer, having at least one computer processor executing computer program instructions stored on at least one non-transitory computer-readable medium, capable of receiving data from and transmitting data to each of the plurality of user devices;

a plurality of trackers located within the coverage area, wherein each tracker is capable of transmitting and receiving wireless signals;

a plurality of locator beacons located within the coverage area, wherein each of the locator beacons is associated with a location within the coverage area;

wherein at least one of the locator beacons wirelessly broadcasts a location signal;

wherein for each locator beacon that broadcasts the location signal, the location signal contains location data indicating the location within the coverage area that the locator beacon that broadcasted the location signal is associated with;

wherein the location signal containing the location data is received by at least one of the trackers;

wherein the location data contained within the location signal is wirelessly transmitted to at least one of the user devices by the at least one tracker that received the location signal;

wherein location data that is received by the at least one user device is wirelessly transmitted to the computer by the at least one user device that received the location data; and wherein the at least one computer processor executes the computer instructions to process the location data to determine a location of a particular user device or a location of a particular tracker within the coverage area.

2. The system of claim 1, wherein the least one computer processor executes the computer instructions to display the location of a particular user device or the location of a particular tracker within the coverage area to a backend user.

3. The system of claim 1, wherein after the location of a particular user device within the coverage area is determined, a push notification is transmitted to the particular user device, wherein the push notification contains information relevant to an active emergency situation.

4. The system of claim 3, where the information relevant to the active emergency situation includes an advised action.

5. The system of claim 4, wherein the advised action includes a suggested escape route.

6. The system of claim 1, wherein the plurality of locator beacons comprises at least one master beacon, at plurality of smart beacons, and a plurality of tracker beacons;

wherein a tracker beacon is the locator beacon that broadcasts the location signal;

wherein the master beacon is in network communication with the computer;

wherein upon activation by a backend user the computer transmits a wireless signal to the at least one master beacon;

wherein upon receiving the wireless signal indicating the existence of an active emergency situation, the master beacon broadcasts a wireless signal containing a first UUID associated with an active emergency situation;

wherein each of the plurality of the smart beacons, in response to receiving the wireless signal containing the first UUID, begins transmitting a wireless signal containing a second UUID;

wherein each of the smart beacons transmit the wireless signal containing the second UUID for a first predetermined amount of time;

wherein after the first predetermined amount of time, each of the smart beacons transmits a wireless signal that contains a third UUID;

wherein each of the smart beacons transmit the wireless signal containing the third UUID for a second predetermined amount of time.

7. The system of claim 1 wherein the wirelessly broadcast of the least one locator beacons is a Bluetooth signal.

8. The system of claim 6 wherein the wireless signals containing the first UUID, the second UUID, and the third UUID are Bluetooth signals.

9. A system for persons to avoid active danger comprising:

a plurality of user devices located within a coverage area, wherein each user device is associated with a particular person of a plurality of persons located within the coverage area;

a plurality of locator beacons located within the coverage area;

a plurality of location trackers located within the coverage area, wherein each location tracker is associated with a particular person of the plurality of persons located within the coverage area;

a server in network communication with each of the plurality of user devices and having at least one computer processor executing computer program instructions stored on at least one non-transitory computer-readable medium;

wherein, at least one of the locator beacons broadcasts a location signal, the location signal having location data indicating the location of the locator beacon which broadcasted the location signal within the coverage area;

wherein at least one location tracker receives the location signal;

wherein the server receives the location data contained in the location signal;

wherein the at least one computer processor of the server executes the computer program instructions to determine the location of at least one of the plurality of persons within the coverage area using the location data; and wherein the location data is transmitted to the server by the at least one location tracker that received the location signal or by at least one user device that received the location data after the at least one location tracker that received the location signal wirelessly transmitted the location data to the at least one user device.

10. The system of claim 9, wherein, upon determining the location of at least one of the plurality of persons within the coverage area, the location of the at least one person is displayed on a display screen.

11. The system of claim 10, wherein upon determining the location of at least one of the plurality of persons within the coverage area, the server transmits a push notification to the at least one of the plurality of persons whose location was determined.

12. The system of claim 11, wherein the push notification contains information relevant to an active emergency situation based on the location of the at least one of the plurality of persons whose location was determined.

13. The system of claim 9, further comprising at least one display screen located within the coverage area;

wherein the at least one display screen is in network communication with the server; and wherein the server transmits a network communication to the display screen containing information to be displayed on the display screen that is relevant an active emergency situation.

14. The system of claim 9, wherein a portion of locator beacons all broadcast a first UUID during a first time period and, after the first time period, all broadcast a second UUID during a second time period.

15. A system of self-organized Bluetooth devices, comprising:

at least one first Bluetooth device capable of transmitting and receiving Bluetooth signals and having a UUID, a rank, a window, and a slot associated with the first Bluetooth device;

a plurality of second Bluetooth devices capable of transmitting and receiving Bluetooth signals and having a UUID, a rank, a window, and a slot associated with each second Bluetooth device;

wherein, the at least one first Bluetooth device transmits a first Bluetooth signal, wherein the first Bluetooth signal includes the UUID, the rank, the window, and the slot associated with the first Bluetooth device;

wherein, at least one of the plurality of second Bluetooth devices receives and processes the first Bluetooth signal;

wherein, processing the first Bluetooth signal includes the steps of extracting the UUID, rank, window, or slot information associated with the first Bluetooth device and determining if the UUID is an activation UUID;

wherein, in response to determining that the UUID is an activation UUID, the second Bluetooth device:

updates the UUID of second Bluetooth device to be equal to the UUID of the first Bluetooth device, updates the window of the second Bluetooth device to be equal to the window of the first Bluetooth device, updates the slot of the second Bluetooth device to be equal to the slot of the first Bluetooth device, sets the rank of the second Bluetooth device to rank 1, and transmits a second Bluetooth signal, wherein the second Bluetooth signal includes the updated UUID, the rank, the window, and the slot associated with the second Bluetooth device;

wherein the second Bluetooth signal is received by at least one of the plurality of second Bluetooth devices which did not receive the first Bluetooth signal;

wherein the second Bluetooth device which did not receive the first Bluetooth signal and did receive the second Bluetooth signal processes the second Bluetooth signal;

wherein processing the second Bluetooth signal includes the steps of extracting the UUID, rank, window, or slot information associated with the second Bluetooth device that transmitted the second Bluetooth signal, determining if the UUID is an activation UUID, and determining that the rank of the second Bluetooth device that transmitted the signal is superior to the rank of the second Bluetooth device that received the second Bluetooth signal;

wherein, in response to determining that the UUID is an activation UUID and that the rank of the second Bluetooth device that transmitted the signal is superior to the rank of the second Bluetooth device that received the second Bluetooth signal, the second Bluetooth device:

updates the UUID of second Bluetooth device to be equal to the UUID of the second Bluetooth device from which the transmission was received, updates the window of the second Bluetooth device to be equal to the window of the second Bluetooth device from which the transmission was received, updates the slot of the second Bluetooth device to be equal to the slot of the second Bluetooth device from which the transmission was received, updates the rank of the second Bluetooth device to be one plus the rank of second Bluetooth device from which the transmission was received, and transmits a third Bluetooth signal, wherein the third Bluetooth signal includes the updated UUID, the rank, the window, and the slot associated with the second Bluetooth device;

wherein each window is one of a plurality of sequential windows and each window is associated with one of a plurality of activation UUIDs, wherein each of the windows defines a timeframe in which the first Bluetooth device and each of the plurality of second Bluetooth devices broadcast the activation UUID associated with a current window; and wherein, at the end of the time period of each current window, the first Bluetooth device and each of the plurality of second Bluetooth devices that has updated its UUID, window, slot, and rank in response to receiving the first or second Bluetooth signal update their windows to the next window in the sequence and begin broadcasting the activation UUID associated with the updated window.

16. The system of claim 15, wherein at the end of the time period of a final window of the plurality of sequential windows, the window of the at least one first Bluetooth device and each of the plurality of second Bluetooth that has updated its UUID, window, slot, and rank in response to receiving the first or second Bluetooth signal devices resets to an initial window of the plurality of sequential windows.

17. The system of claim 16, where the plurality of sequential windows is four windows each associated with one of four activation UUIDs.

18. The system of claim 17, wherein the timeframe of each window is about 30 seconds.

19. The system of claim 15, wherein the at least one first Bluetooth device and each of the plurality of second Bluetooth devices is an iBeacon.

20. The system of claim 19, wherein the rank, window, and slot associated with the at least one Bluetooth device or with one of the plurality of second Bluetooth devices is encoded within major or minor values of iBeacon frames.

* * * * *